US011300949B2

(12) United States Patent
Kato et al.

(10) Patent No.: US 11,300,949 B2
(45) Date of Patent: Apr. 12, 2022

(54) DATA PROCESSING DEVICE OF PRODUCTION EQUIPMENT

(71) Applicant: JTEKT CORPORATION, Osaka (JP)

(72) Inventors: Tomohisa Kato, Chiryu (JP); Akio Uchino, Kashihara (JP); Toshihiko Yotsui, Nukata-gun (JP); Yuki Ishigure, Gifu (JP); Asami Hara, Kariya (JP); Tatiana Kundozerova, Kariya (JP); Tatsuo Oshiumi, Kariya (JP)

(73) Assignee: JTEKT CORPORATION, Osaka (JP)

( * ) Notice: Subject to any disclaimer, the term of this patent is extended or adjusted under 35 U.S.C. 154(b) by 919 days.

(21) Appl. No.: 16/057,337

(22) Filed: Aug. 7, 2018

(65) Prior Publication Data

US 2019/0049939 A1 Feb. 14, 2019

(30) Foreign Application Priority Data

Aug. 11, 2017 (JP) .............................. JP2017-156262
Aug. 11, 2017 (JP) .............................. JP2017-156263
Oct. 30, 2017 (JP) .............................. JP2017-209547

(51) Int. Cl.
*G05B 23/02* (2006.01)
*G05B 19/4065* (2006.01)

(52) U.S. Cl.
CPC ..... *G05B 23/0205* (2013.01); *G05B 19/4065* (2013.01); *G05B 23/0221* (2013.01)

(58) Field of Classification Search
None
See application file for complete search history.

(56) References Cited

U.S. PATENT DOCUMENTS 5,571,957 A    11/1996    Tanaka
5,780,725 A    7/1998     Tanaka
(Continued)

FOREIGN PATENT DOCUMENTS

JP    61-188122 A    8/1986
JP    7-51998       2/1995
(Continued)

OTHER PUBLICATIONS

Japanese Office Action dated May 11, 2021 in Japanese Patent Application No. 2017-156262 (with English translation), 8 pages.
(Continued)

*Primary Examiner* — Carlos R Ortiz Rodriguez
(74) *Attorney, Agent, or Firm* — Oblon, McClelland, Maier & Neustadt, L.L.P.

(57) ABSTRACT

To provide a data processing device of production equipment that can generate data usable by an operator or an administrator by performing processing for a collected plurality of types of data. A data processing device includes a reference-data acquiring unit configured to acquire, in production equipment, reference data including information concerning time in which a reference for grouping of data operates, a target-data acquiring unit configured to acquire target data concerning a state of the production equipment detected by detectors provided in the production equipment, and a combined-data generating unit configured to generate, for each group of the reference data, combined data for each group obtained by combining, with the reference data, data detected in the same period of time as an operation period of time of the reference data in the target data.

11 Claims, 23 Drawing Sheets

(56) References Cited

U.S. PATENT DOCUMENTS

| | | |
|---|---|---|
| 6,615,103 B2 | 9/2003 | Fujishima et al. |
| 10,081,088 B2 | 9/2018 | Yamamoto et al. |
| 2002/0013639 A1 | 1/2002 | Fujishima et al. |
| 2007/0244609 A1 | 10/2007 | Kinoshita et al. |
| 2014/0207273 A1 | 7/2014 | Tsutsumi et al. |
| 2016/0103444 A1 | 4/2016 | Ogawa |
| 2016/0184945 A1 | 6/2016 | Saitou |
| 2016/0380574 A1 | 12/2016 | Kurosumi |
| 2017/0106487 A1 | 4/2017 | Yamamoto et al. |

FOREIGN PATENT DOCUMENTS

| | | |
|---|---|---|
| JP | 7-314284 A | 12/1995 |
| JP | 10-329187 A | 12/1998 |
| JP | 11-28647 A | 2/1999 |
| JP | 2001-246534 | 9/2001 |
| JP | 2001-350510 A | 12/2001 |
| JP | 2002-202806 A | 7/2002 |
| JP | 3414985 | 6/2003 |
| JP | 2003-225841 | 8/2003 |
| JP | 2003-340684 A | 12/2003 |
| JP | 2007-286904 A | 11/2007 |
| JP | 2007-310611 A | 11/2007 |
| JP | 2008-55533 | 3/2008 |
| JP | 2009-20090 A | 1/2009 |
| JP | 2011-242830 A | 12/2011 |
| JP | 5411055 | 2/2014 |
| JP | 5628994 | 11/2014 |
| JP | 2016-74072 | 5/2016 |
| JP | 2016-74072 A | 5/2016 |
| JP | 2016-120580 | 7/2016 |
| JP | 2016-224938 | 12/2016 |
| JP | 2017-7070 | 1/2017 |
| JP | 2017-77588 | 4/2017 |
| JP | 2017-77588 A | 4/2017 |
| JP | 2017-97628 | 6/2017 |

OTHER PUBLICATIONS

Japanese Office Action dated May 25, 2021 in Japanese Patent Application No. 2017-156263 (with English translation), 8 pages.

Japanese Office Action dated Apr. 27, 2021 in Japanese Patent Application No. 2017-209547 (with English translation), 8 pages.

FIG.4

File_A

| DATE AND TIME | TOOL NUMBER |
|---|---|
| 20170701_10:15:10 | T3 |
| 20170701_10:23:43 | T1 |
| 20170701_10:25:35 | T7 |

FIG.5

File_B

| DATE AND TIME | SPINDLE DRIVING CURRENT |
|---|---|
| 20170701_10:15:10 | ... |
| 20170701_10:15:11 | ... |
| 20170701_10:15:12 | ... |
| 20170701_10:23:43 | ... |
| 20170701_10:23:44 | ... |
| 20170701_10:23:45 | ... |
| 20170701_10:25:35 | ... |
| 20170701_10:25:36 | ... |
| 20170701_10:25:37 | ... |

FIG.6  File_C

| DATE AND TIME | TOOL NUMBER | SPINDLE DRIVING CURRENT | |
|---|---|---|---|
| 20170701_10:15:10 | T3 | ... | ⎫ |
| 20170701_10:15:11 | T3 | ... | ⎬ Gr1 |
| 20170701_10:15:12 | T3 | ... | ⎭ |
| 20170701_10:23:43 | T1 | ... | ⎫ |
| 20170701_10:23:44 | T1 | ... | ⎬ Gr2 |
| 20170701_10:23:45 | T1 | ... | ⎭ |
| 20170701_10:25:35 | T7 | ... | ⎫ |
| 20170701_10:25:36 | T7 | ... | ⎬ Gr3 |
| 20170701_10:25:37 | T7 | ... | ⎭ |

FIG.7A  File_D_Gr1

| DATE AND TIME | TOOL NUMBER | SPINDLE DRIVING CURRENT |
|---|---|---|
| 20170701_10:15:10 | T3 | ... |
| 20170701_10:15:11 | T3 | ... |
| 20170701_10:15:12 | T3 | ... |
| 20170701_10:23:42 | T3 | ... |

FIG.7B  File_D_Gr2

| DATE AND TIME | TOOL NUMBER | SPINDLE DRIVING CURRENT |
|---|---|---|
| 20170701_10:23:43 | T1 | ... |
| 20170701_10:23:44 | T1 | ... |
| 20170701_10:23:45 | T1 | ... |
| 20170701_10:25:34 | T1 | ... |

FIG.7C  File_D_Gr3
FIG.8  File_A2

FIG.9
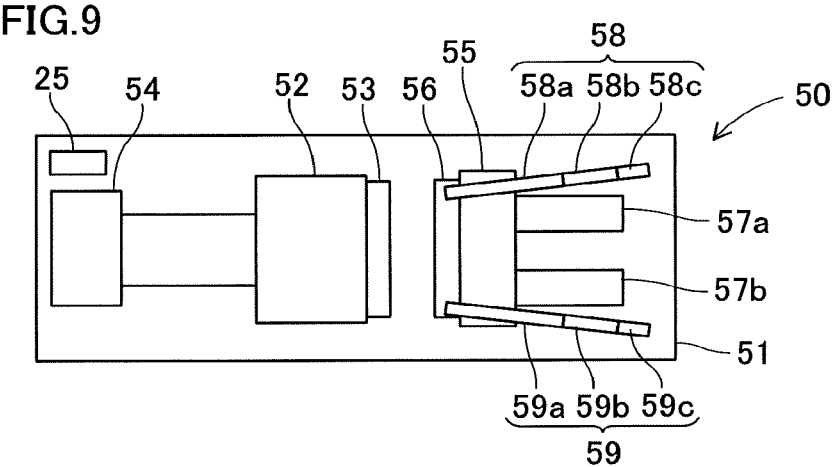
FIG.10
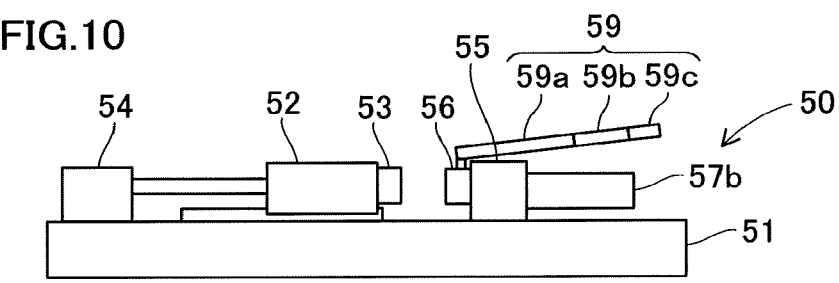
FIG.11
| GROUP | PUMP | ROTATING DIRECTION |
|---|---|---|
| GROUP1 | PUMP 58b | REGULAR ROTATION |
| GROUP2 | | REVERSE ROTATION |
| GROUP3 | PUMP 59b | REGULAR ROTATION |
| GROUP4 | | REVERSE ROTATION |

SWASH PLATE ANGLE

SWASH PLATE ANGLE

SWASH PLATE ANGLE

DATA PROCESSING DEVICE OF PRODUCTION EQUIPMENT

CROSS REFERENCE TO RELATED APPLICATIONS

This application claims priority based on Japanese Patent Application No. 2017-156262 filed on Aug. 11, 2017, Japanese Patent Application No. 2017-156263 filed on Aug. 11, 2017, and Japanese Patent Application No. 2017-209547 filed on Oct. 30, 2017, the entire contents of which are incorporated by reference herein.

BACKGROUND OF THE INVENTION

Technical Field

The present invention relates to a data processing device of production equipment.

Background Art

JP-A-2016-224938 describes an abnormality diagnosis system for detecting, with a microphone or a vibration sensor, abnormality of drive components in a monitoring target device including a plurality of driving units. The abnormality diagnosis system separates sensor signals detected by the sensor for each of the drive components of different types and for each of the drive components of the same types having different operation timings and performs abnormality discrimination using the separated signals. The types, the operation timings, and the like of the drive components are stored in a database in advance.

JP-A-2017-97628 describes a maintenance system that can confirm content of maintenance data concerning respective maintenance jobs in a plurality of plant bases. The maintenance system acquires, for each of the plant bases, abnormality information of a plurality of abnormality types of the plurality of plant bases and displays, as a summary table, for each of the plant bases, maintenance data associated with each of the abnormality types of the abnormality information of the plant bases.

Japanese Patent No. 3414985 describes a failure diagnosis device of a hydraulic pump of an injection molding machine. Magnetic sensors are respectively provided on an intake side and a discharge side of the pump. The failure diagnosis device compares magnetism amounts detected by the magnetic sensors and determines an abnormal state.

JP-A-2017-77588 describes detecting abnormality of a spindle of a machine tool. Japanese Patent No. 5628994 describes detecting abnormality of a motor of a spindle of a machine tool. JP-A-2017-7070 describes determining abnormality according to a motor load of a chip conveyor used in a machine tool. JP-A-2008-55533 describes an inspection window for confirming abnormality of a chip conveyor. JP-A-2003-225841 and JP-A-2016-120580 describe detecting abnormality of a pallet changer of a machine tool. JP-A-2016-74072 describes detecting abnormality of a tool automatic exchange device.

JP-A-2001-246534 describes setting, in advance, for each of tools, a wear evaluation index corresponding to a progress degree of wear of the tool that progresses according to implementation of machining processes, calculating, for each of tools in use, a cumulative wear evaluation index accumulated according to repetition of the machining processes, and, when the cumulative wear evaluation index reaches a limit index, determining that the tool in use has exhausted life.

Japanese Patent No. 5411055 describes predicting, using specific cutting resistance measured beforehand concerning a workpiece scheduled to be machined this time and an already measured machining load value concerning a workpiece machined before the workpiece scheduled to be machined this time and specific cutting resistance corresponding to the machining load value, a machining load value predicted to occur when the workpiece scheduled to be processed this time is machined and detecting, using the predicted machining load value, whether a tool has exhausted life.

JP-A-7-51998 describes calculating a correction coefficient taking into account a material coefficient depending on a machining material and a machining condition coefficient depending on machining conditions, multiplying a use time of a tool by the correction coefficient to correct the use time of the tool, and accumulating the corrected use time of the tool to estimate the life of the tool.

SUMMARY OF THE INVENTION

First Problem

In JP-A-2016-224938, preparation and the like are necessary to store the types, the operation timings, and the like of the drive components in the database in advance. This has a harmful effect in using data on a real-time basis. In recent years, it has been known that a large amount of various data concerning production equipment called bigdata is collected and the collected data is used for abnormality detection and the like of the production equipment. In particular, because the bigdata can be collected on a real-time basis, the big data can be used on a real-time basis.

However, data to be collected is not limited to data detected by a sensor and includes data used for control. A large amount of various data is collected. Therefore, it is requested to perform appropriate processing of the collected data according to a purpose.

A first object of the present invention is to provide a data processing device of production equipment that can generate data usable by an operator or an administrator by performing processing for a collected plurality of types of data.

Second Problem

It is requested to appropriately detect a state of production equipment and suitably utilize a result of the detection of the state of the production equipment. A second object of the present invention is to provide a data processing device of production equipment that can appropriately detect a state of the production equipment and suitably utilize a result of the detection of the state of the production equipment.

Third Problem

The prior art described in JP-A-2001-246534 can be applied when the same machining process is repeated but cannot be applied when different machining processes are performed. That is, the prior art described in JP-A-2001-246534 is applied when a workpiece of the same type is mass-produced. However, the prior art cannot be applied to life prediction of a tool in production of a variety of products in small amounts, that is, when a small amount of various workpieces are machined.

A state of a tool such as sharpness of the tool changes from a start of use until exhaustion of life of the tool. However, in the prior arts described in Japanese Patent No. 5411055 and JP-A-7-51998, the change of the state of the tool cannot be considered. Therefore, with the prior arts, highly accurate life prediction for the tool cannot be performed.

A third object of the present invention is to provide a tool life predicting device capable of performing life prediction for a tool in production of a variety of products in small amounts and capable of performing highly accurate life prediction for the tool by considering a state of the tool from a start of use until exhaustion of life of the tool.

To solve the first problem, a data processing device of production equipment according to the present invention is configured as follows. The data processing device of the production equipment includes: a reference-data acquiring unit configured to acquire, in the production equipment, reference data including information concerning time in which a reference for grouping of data operates; a target-data acquiring unit configured to acquire target data concerning a state of the production equipment detected by a detector provided in the production equipment; and a combined-data generating unit configured to generate, for each group of the reference data, combined data for each group obtained by combining, with the reference data, data detected in a same period of time as an operation period of time of the reference data in the target data.

With the device according to the present invention, the reference data and the target data are acquired and, when the operation period of time of the reference data and the detection period of time of the target data are the same period of time, the combined data for each group obtained by combining the reference data and the target data for each group of the reference data is generated. By associating times of both the data in this way, it is possible to divide the target data for each group of the reference data.

Further, by associating the times of both the data, it is possible to combine the reference data for each group and division data corresponding to the group in the target data. The combined data for each group is data with which an operator or an administrator can grasp a state of the production equipment in each group. Therefore, the operator or the administrator can easily grasp the state of the production equipment. With the data processing device, the combined data for each group can be obtained based on an acquired plurality of data. Therefore, the combined data for each group can be easily generated.

BRIEF DESCRIPTION OF DRAWINGS

FIG. 4 is a diagram showing basic data;
FIG. 5 is a diagram showing target data;
FIG. 6 is a diagram showing overall combined data;
FIG. 7A is a diagram showing combined data for each group of a group Gr1;
FIG. 7B is a diagram showing combined data for each group of a group Gr2;
FIG. 7C is a diagram showing combined data for each group of a group Gr3;
FIG. 8 is a diagram showing basic data in a second embodiment;
FIG. 9 is a plan view showing an injection molding machine, which is production equipment in a third embodiment;
FIG. 10 is a front view showing the injection molding machine;
FIG. 11 is a diagram showing grouping.

DETAILED DESCRIPTION OF INVENTION

Figure 1:
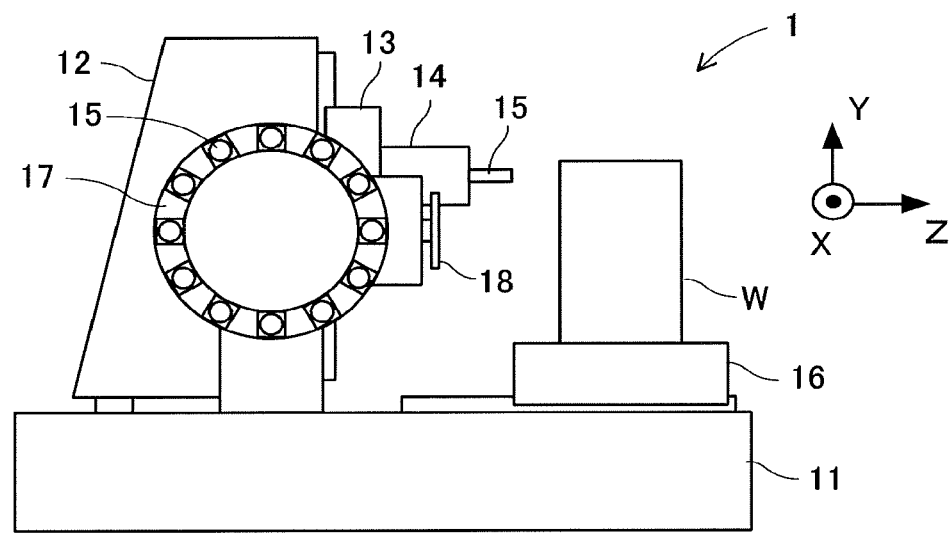
FIG. 1 is a diagram showing a machining center, which is production equipment in a first embodiment.

1. First Embodiment (1-1. Configuration of Production Equipment 1)

Production equipment 1 is equipment that produces a predetermined production target object W. The production equipment 1 includes various types of equipment such as a machine tool, an injection molding machine, a casting machine, a conveying device, and an industrial robot. For example, in the machine tool, the production target object W is a workpiece, which is a machining target.

An example of the production equipment 1 is explained with reference to FIGS. 1 and 2. The production equipment is a machine tool that machines a workpiece in a production line. A lateral machining center is explained as an example. Note that, as the configuration of the machining center functioning as the production equipment 1, various publicly-known configurations can be adopted besides a configuration explained below.

The machining center is configured, for example, as explained below. A bed 11 is fixed to a setting surface. A column 12 is supported on the bed 11 to be movable in an X-axis direction (the paper surface front-rear direction in FIG. 1). A saddle 13 is supported on a front surface (a right surface in FIG. 1) of the column 12 to be movable in a Y-axis direction (the up-down direction in FIG. 1). A spindle device 14 is provided in the saddle 13. A tool 15 is held by a spindle (not shown in FIG. 1), which is a rotating body in the spindle device 14.

On the bed 11, a table 16 is supported in a position opposed to the column 12 in a Z-axis direction (the left-right direction in FIG. 1) to be movable in the Z-axis direction. A workpiece, which is the production target object W, is fixed on the table 16. Further, on the bed 11, a tool magazine 17 is provided on a side of the column 12. A plurality of tools 15 are housed in the tool magazine 17. Further, an automatic tool exchange device 18 is provided. The automatic tool exchange device 18 exchanges the tool 15 of a designated tool number and the tool 15 held by the spindle device 14 among the plurality of tools 15 housed in the tool magazine 17.

Further, the machining center, which is the production equipment 1, includes a CNC (Computerized Numerical Control) device 21, a PLC (Programmable Logic Controller) 22, various detectors 23a, 23b, 23c, 23d, 24a, 24b, and 24c, and a data processing device 25.

According to an NC program, the CNC device 21 controls a motor (not shown in FIG. 1) for rotating the spindle in the spindle device 14 and controls a motor (not shown in FIG. 1) for relatively moving the tool 15 attached to the spindle device 14 and the workpiece, which is the production target object W. The CNC device 21 acquires, for example, detection information by the detector 23a for detecting a driving current of a motor of the spindle device 14, the detector 23b for detecting a driving current of a motor for moving the column 12, the saddle 13, and the table 16, and the detector 23c for detecting an X-axis position of the column 12, a Y-axis position of the saddle 13, a Z-axis position of the table 16, and the like and performs control of the motors. The CNC device 21 acquires detection information by the detector 23d for detecting an outdoor air temperature and performs, for example, thermal displacement correction.

The PLC 22 performs sequence control according to a ladder circuit, a sequential function chart (SFC), and the like. The PLC 22 acquires information concerning ON/OFF of the detectors 24a, 24b, and 24c provided in the production equipment 1. For example, the PLC 22 controls operation for moving the tool 15 of the designated tool number to an exchange position in the automatic tool exchange device 18 and controls the operation of the automatic tool exchange device 18. The PLC 22 controls a pump of a coolant device (not shown in FIG. 1) to control supply of coolant.

The data processing device 25 acquires detection data of the detectors 23a to 23d and 24a to 24d provided in the production equipment 1 (equivalent to data concerning the production equipment 1), control data in the CNC device 21, I/O data stored in an I/O memory in the PLC 22, and the like.

The data processing device 25 is, for example, disposed on the inner side of on the bed 11 or housed in a housing of a control board (not shown in FIG. 1). The data processing device 25 is connected to the CNC device 21 and the PLC 22. For example, the data processing device 25 includes a LAN connector and a USB connector. The data processing device 25 is connected to the CNC device 21 and the PLC 22. That is, the data processing device 25 is connected to the CNC device 21 and the PLC 22 by an Ethernet (registered trademark), an EtherCAT (registered trademark), or the like. That is, the data processing device 25 communicates with the CNC device 21 and the PLC 22 using, for example, a network protocol of lower-order two layers (a physical layer and a data link layer) of an OSI reference model.

In general, as an Internet protocol suite, a protocol of a third layer (a network layer) or a higher layer of the OSI reference model is used. A data transfer rate by the physical layer and the data link layer is high compared with a data transfer rate by the Internet protocol suite.

The data processing device 25 in this embodiment configures edge computing connected by a protocol of a low-order layer near communication targets (the CNC device 21 and the PLC 22). Note that the edge computing is used as an appellation compared with cloud computing in which Internet protocol suite is used.

An input device 26 and a display device 27 can be detachably connected to the data processing device 25 as external devices. Therefore, the data processing device 25 includes a terminal for connecting the data processing device 25 to the display device 27. The input device 26 inputs and edits setting content of the data processing device 25. The display device 27 can display processing content by the data processing device 25. Note that the data processing device 25 may include the input device 26 and the display device 27.

Further, when a LAN connector is used for connection to a server and the like, the data processing device 25 can transfer data such as a processing result to a managing device 28 such as the server.

Note that the data processing device 25 is explained as a device separate from the CNC device 21 and the PLC 22. However, the data processing device 25 can be a system incorporating the CNC device 21, the PLC 22, and the like and can also be a personal computer, a server, or the like disposed in a position separate from the production equipment 1.

(1-2. Configuration of the Data Processing Device 25)

Figure 3:
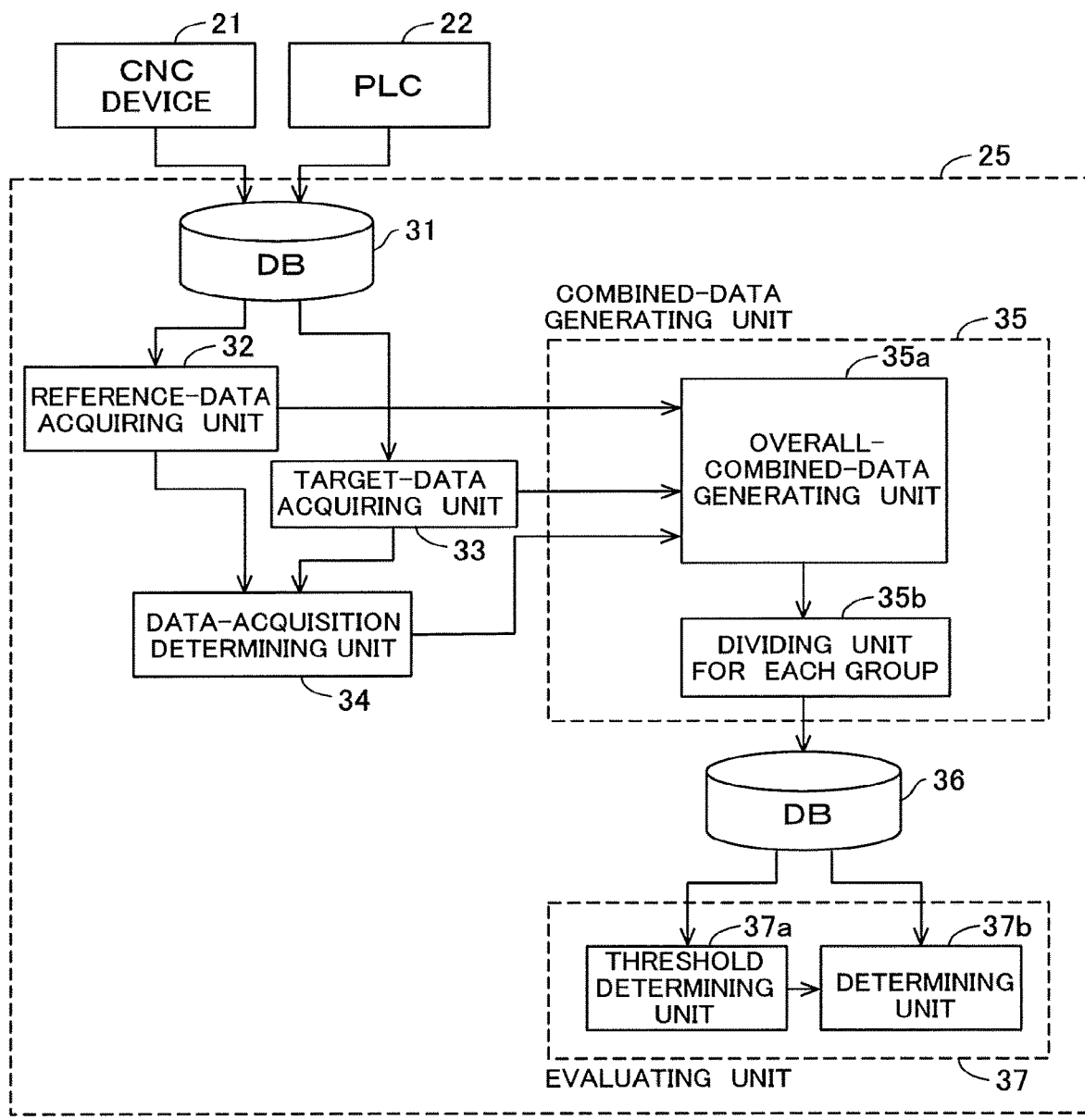
FIG. 3 is a functional block diagram of a data processing device.

The configuration of the data processing device 25 is explained with reference to FIGS. 3 to 7C. As shown in FIG. 3, the data processing device 25 includes a first database 31, a reference-data acquiring unit 32, a target-data acquiring unit 33, a data-acquisition determining unit 34, a combined-data generating unit 35, a second database 36, and an evaluating unit 37.

The first database 31 acquires and stores data of a preset type among data stored by the CNC device 21 and the PLC 22. In the first database 31, data detected by the detectors 23a to 23d and 24a to 24c is stored via the CNC device 21 and the PLC 22. Further, in the first database 31, data used for control by the CNC device 21 and I/O data used for control of the PLC 22 are stored.

For example, when a plurality of workpieces are continuously machined by the machining center, data is stored in the first database 31 every time one workpiece is finished being machined. That is, when one workpiece is finished being machined, data concerning the workpiece is stored anew in the first database 31. The data may be saved in a storage medium as a data file or the like. The data may be added in one cycle such as one machining cycle or may be acquired and added at a fixed period.

It is assumed that the first database 31 includes reference data concerning a tool number (equivalent to "identification information of a tool") of the tool 15 currently in use (equivalent to "reference" or "reference for grouping" in the present invention). Reference data (File_A) concerning the tool 15 includes, as shown in FIG. 4, a tool number serving as identification information of the tool 15 and operation time information (including date and time) of the tool 15. In this embodiment, an example of the reference data includes time when the tool 15 operates (time when machining is started by the tool 15) and a tool number serving as identification information of the tool 15 used at the time. The tool number of the tool 15 is acquired from execution information of an NC program of the CNC device 21, information concerning a tool exchanging operation of the PLC 22, or the like.

A group in the reference data concerning the tool 15 is a group corresponding to each of a plurality of types of tools 15. That is, if a type of the tool 15 is different, the group is different. Note that, in FIG. 4, new reference data is recorded at timing when the tool 15 is changed. Timing when the reference data is stored may be a predetermined period.

Further, the first database 31 includes target data concerning a state of the production equipment 1 detected by the detectors 23a to 23d and 24a to 24c provided in the production equipment 1 functioning as a machine tool. For example, the first database 31 includes a use time of the tool 15, feature values of torque of the motor of the spindle device 14, feature values of torque of motors in X, Y, and Z axes, feature values concerning vibration of the spindle device 14, and machining conditions, and a material of the production target object W.

The use time of the tool 15 is a cumulative use time from a start of use of the tool 15. The feature values of the torque of the motor of the spindle device 14 are, for example, a peak value, a variance value, and an average of the torque. The feature values of the torque of the motors in the X, Y, and Z axes are a peak value, a variance value, an average, and the like of the torque. The feature values concerning the vibration of the spindle device 14 are a machining frequency peak (corresponding to "spindle rotating speed×number of blades of a tool"), a rotation frequency peak (corresponding to "spindle rotating speed"), an overall value (corresponding to "total value of FFT values of vibration values"), an RMS value (corresponding to "fluctuation in FFT values of vibration values"), and the like. The machining conditions are spindle rotating speed, feeding speed in X, Y, and Z axes, and a cutting depth, and the like.

For example, the first database 31 includes target data detected by the detector 23a for detecting a driving current of the motor of the spindle device 14. The target data (File_B) includes, as shown in FIG. 5, information concerning time (including date and time) when the driving current of the motor of the spindle device 14 is detected by the detector 23a and data of the driving current of the motor of the spindle device 14 acquired by the detector 23a at the time. In this embodiment, an example of the target data includes, as shown in FIG. 5, time (date and time) when the driving current of the motor of the spindle device 14 is detected and data of the driving current of the motor of the spindle device 14 acquired by the detector 23a at the time. The target data is not information that can be grouped by itself. The target data is stored at every predetermined period. Note that a sampling period of acquisition of a tool number of the tool 15 is longer than a sampling period of detection data of a driving current of the motor of the spindle device 14.

The reference-data acquiring unit 32 acquires reference data serving as a reference for grouping out of the data stored in the first database 31. The target-data acquiring unit 33 acquires target data out of the data stored in the first database 31.

Based on a preset algorithm, the data-acquisition determining unit 34 determines that the reference-data acquiring unit 32 has acquired the reference data and determines that the target-data acquiring unit 33 has acquired the target data. When one workpiece is finished being machined, the reference data (File_A) and the target data (File_B) are stored in the first database 31. Therefore, at timing when one workpiece is finished being machined, the reference-data acquiring unit 32 acquires the reference data (File_A) and the target-data acquiring unit 33 acquires the target data (File_B). That is, the data-acquisition determining unit 34 determines that both the data are acquired at the timing when one workpiece is finished being machined.

When the data-acquisition determining unit 34 determines that the reference data (File_A) and the target data (File_B) are acquired, the combined-data generating unit 35 starts generation of combined data for each group. The combined data for each group is data obtained by combining, with the reference data (File_A), for each group of the reference data (File_A) (for each type of the tool 15), data detected in the same period of time as an operation period of time of the reference data (File_A) in the target data (File_B).

The combined-data generating unit 35 includes an overall-combined-data generating unit 35a and a dividing unit for each group 35b (a diving unit for each tool). The overall-combined-data generating unit 35a acquires the reference data (File_A) and the target data (File_B) from the reference-data acquiring unit 32 and the target-data acquiring unit 33. Subsequently, as shown in FIG. 6, the overall-combined-data generating unit 35a generates overall combined data (File_C) obtained by associating the acquired reference data (File_A) and the acquired target data (File_B) according to an operation time of the reference data (File_A) and a detection time of the target data (File_B) and combining the reference data (File_A) and the target data (File_B).

That is, the overall combined data (File_C) includes data of time (date and time), a tool number of the tool 15 operating at the time, and a driving current detected at the time. In this case, as shown in FIG. 6, information concerning a tool number at time when the reference data (File_A) is absent takes over the immediately preceding information. That is, the tool number is T3 until the tool number is changed from T3 to T1. The tool number is T1 until the tool number is changed from T1 to T7.

The dividing unit for each group 35b divides, based on groups (Gr1, Gr2, and Gr3) of the reference data (File_A) in the overall combined data (File_C), the overall combined data (File_C) for each group to thereby generate combined data for each group (File_D_Gr1, File_D_Gr2, and File_D_Gr3) for each group as shown in FIGS. 7A to 7C. That is, the combined data for each group includes data of time (date and time), a tool number of the tool 15 operating at the time, and a driving current detected at the time. In the same combined data for each group, the tool number is the same.

The second database 36 stores the combined data for each group (File_D_Gr1, File_D_Gr2, and File_D_Gr3) generated by the dividing unit for each group 35b. The processing is continued, whereby combined data for each group for a plurality of workpieces are stored in the second database 36.

The evaluating unit 37 determines a threshold for each group using the combined data for each group and evaluates, based on the threshold, a state of the production equipment 1 for each group. The evaluating unit 37 includes a threshold determining unit 37a and a determining unit 37b.

The threshold determining unit 37a acquires, from the second database 36, for each group, a plurality of combined data for each group as threshold determination targets. That is, the threshold determining unit 37a acquires, for each tool number, a plurality of combined data for each group. Subsequently, the threshold determining unit 37a acquires a maximum of a driving current among the acquired plurality of combined data for each group and determines, as a threshold for the group, a value obtained by adding a value of fluctuation to the maximum.

After determining the threshold, the determining unit 37b acquires combined data for each group from the second database 36 as an evaluation target. Subsequently, the determining unit 37b determines whether the combined data for each group acquired as the evaluation target exceeds a threshold corresponding to an evaluation target group. When the combined data for each group exceeds the threshold, the determining unit 37b determines that a state concerning the group in the production equipment 1 is abnormal. That is, when the determining unit 37b determines that the combined data for each group exceeds the threshold, it is seen that abnormality is present in a portion concerning the tool 15 of the tool number. It is conceivable that, for example, abnormality is present in the tool 15 itself or abnormality is present in machining conditions by the tool 15.

In the embodiment, because the grouping is performed according to the tools 15, it is possible to mainly determine whether abnormality occurs in the tools 15. Therefore, in the abnormality determination by the determining unit 37b, a workpiece of the same type as a workpiece at the time when the threshold is determined may be set as an evaluation target. However, a workpiece of a different type from the workpiece at the time when the threshold is determined can be set as the evaluation target.

(1-3. Effects)

When the reference data and the target data are acquired and the operation period of time of the reference data and the detection period of time of the target data are the same period of time, the combined data for each group obtained by combining the reference data and the target data for each group of the reference data is generated. By associating the times of both the data, it is possible to divide the target data for each group of the reference data.

Further, by associating the times of both the data, it is possible to combine the reference data for each group and divided data corresponding to the group in the target data. The combined data for each group is data with which the operator or the administrator can grasp a state of the production equipment in each group. Therefore, the operator or the administrator can easily grasp a state of the production equipment. With the data processing device, the combined data for each group can be obtained based on an acquired plurality of data. Therefore, the combined data for each group can be easily generated.

Further, the evaluating unit 37 performs the abnormality determination for each group by using the combined data for each group. In this way, a state for each group can be appropriately evaluated in the production equipment 1. Further, the evaluating unit 37 determines the threshold prior to the evaluation using the combined data for each group. That is, the threshold for the evaluation can be automatically determined by using the combined data for each group.

2. Second Embodiment

In the first embodiment, the reference data is the data concerning the tool number, which is the identification information, of the tool 15 in use among the plurality of tools 15. That is, the group is a group corresponding to each of the plurality of tools 15.

Besides, for example, as shown in FIG. 8, the reference data (File_A2) can be data concerning identification information for a machining process being executed among a plurality of machining processes (a process A, a process B, and a process C). That is, the reference data (File_A2) includes time (date and time) when a machining process, which is a reference for grouping, operates and identification information of a machining process executed at the time. In this case, the group is a group corresponding to each of the plurality of machining processes.

The machining processes mean processes such as boring rough machining, boring finish machining, milling rough machining, milling finish machining, and thinned part machining. That is, even when the same tool 15 is used, machining processes are sometimes different machining processes such as rough machining and finish machining. In this case, the combined data for each group is generated, the threshold is set, and the abnormality determination is performed for each machining process.

3. Third Embodiment

An injection molding machine is explained as an example of production equipment 50 with reference to FIGS. 9 to 10. The injection molding machine molds a product having a desired shape by injecting resin, which is a molding material, into a mold.

The injection molding machine includes a bed 51 set on a setting surface, a moving clamp 52 movably provided on the bed 51, a moving mold 53 detachably attached to the moving clamp 52, and a moving motor 54 that moves the moving clamp 52 with respect to the bed 51.

Further, the injection molding machine includes a fixed clamp 55 fixed on the bed 51, a fixed mold 56 detachably attachable to the fixed clamp 55, motors for mold closing 57*a* and 57*b* for giving a mold closing force to the fixed mold 56, and a plurality of injection plungers 58 and 59 for injecting the molding material to the fixed mold 56. Note that two injection plungers 58 and 59 are provided in this embodiment. However, three or more injection plungers may be provided.

The injection plungers 58 and 59 include plunger bodies 58*a* and 59*a* that inject the molding material into the mold, swash plate-type axial pumps 58*b* and 59*b* (hereinafter referred to as pumps) for supplying the molding material to the plunger bodies 58*a* and 59*a* and discharging the molding material, and motors 58*c* and 59*c* for rotating the pumps 58*b* and 59*b*. The pumps 58*b* and 59*b* include swash plates (not shown in FIGS. 9 and 10) and include driving devices that can change an angle of the swash plates.

Action of the injection molding machine is explained. The moving mold 53 and the fixed mold 56 are mounted on the moving clamp 52 and the fixed clamp 55. Subsequently, the moving motor 54 is driven to bring the moving mold 53 into contact with the fixed mold 56. Subsequently, the motors for mold closing 57*a* and 57*b* are driven to restrict the fixed mold 56 from separating from the moving mold 53 when the molding material is injected.

At the same time, as an initial state, the angle of swash plates of the pumps 58*b* and 59*b* is set to a small angle. The motors 58*c* and 59*c* are driven to rotate the pumps 58*b* and 59*b*. Then, the molding material is injected into a cavity between the moving mold 53 and the fixed mold 56 from the plunger bodies 58*a* and 59*a*. Thereafter, the angle of the swash plates is gradually increased to realize a state in which the motors for mold closing 57*a* and 57*b* exert a predetermined mold closing force. This state is maintained for a predetermined time until the molding material solidifies between the moving mold 53 and the fixed mold 56. Thereafter, the angle of the swash plates is reduced to be returned to the initial state. Then, the moving clamp 52 is moved to separate the moving mold 53 and the fixed mold 56 and take out a molded product.

As in the first embodiment, the injection molding machine includes the data processing device 25. The data processing device 25 acquires control data and detection data from a control device (not shown in FIGS. 9 and 10).

In the data processing device 25 in this embodiment, as shown in FIG. 11, groups are groups corresponding to each of a plurality of pumps 58*b* and 59*b* and corresponding to rotating directions of the pumps 58*b* and 59*b*. Regular rotation of the pumps 58*b* and 59*b* indicates a state in which the molding material is injected. Reverse rotation of the pumps 58*b* and 59*b* indicates a state in which the molding material is discharged. That is, the groups are classified for each pump and for each rotating direction. That is, the pumps and the rotating directions are applied as referends of the grouping. Reference data includes information (a pump type) concerning each pump 58*b*, 59*b* and information concerning a rotating direction of each pump 58*b*, 59*b* among the plurality of pumps 58*b* and 59*b*.

The reference data is control data in the control device in the production equipment 50. The reference data includes operation time and the pumps 58*b* and 59*b* operating at the time and rotating directions of the pumps 58*b* and 59*b*. Control data in the control device is stored in the first database 31 as reference data. The reference-data acquiring unit 32 acquires the reference data, which is the control data, stored in the first database 31.

The target data is the angle of the swash plates of the pumps 58*b* and 59*b* serving as first target data and a mold closing force by the motors for mold closing 57*a* and 57*b* serving as second target data. The target data includes detection data by a detector for detecting the angle of the swash plates and a detector for detecting the mold closing force by the motors for mold closing 57*a* and 57*b* (power of the motors).

Figure 12A:
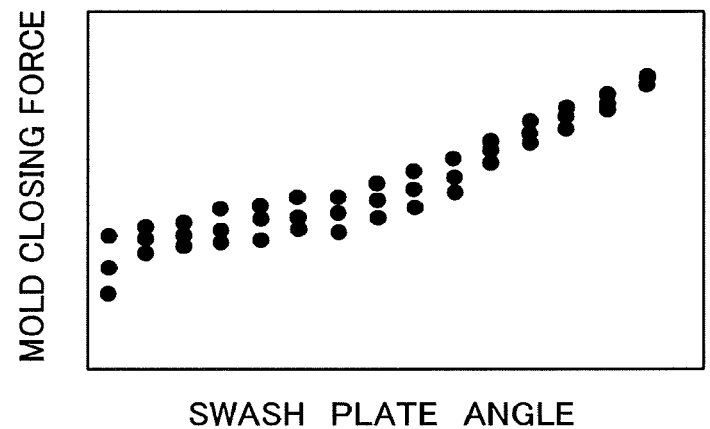
FIG. 12A is a graph showing a relation between an angle of a swash plate of a pump and a mold closing force at the time when the angle of the swash plate is increased and a molding material is injected into a mold.

A plurality of combined data for each group of a group 1 in FIG. 11 generated by the combined-data generating unit 35 of the data processing device 25 are as shown in FIG. 12A when being plotted in a coordinate system in which the first target data and the second target data are set as coordinate axes. As shown in FIG. 12A, by increasing the angle of the swash plates, the mold closing force gradually increases when the molding material is injected into the molds 53 and 56. Fluctuation in the mold closing force is large when the angle of the swash plates is small. The fluctuation in the molding force is smaller as the angle of the swatch plates is larger.

Figure 12B:
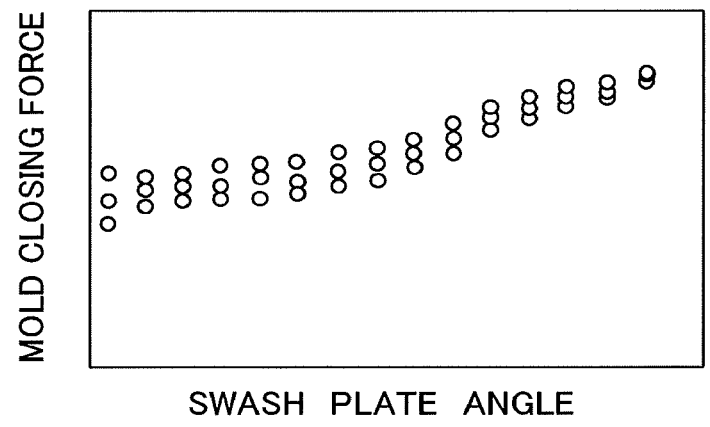
FIG. 12B is a graph showing a relation between an angle of the swash plate of the pump and the mold closing force at the time when the angle of the swash plate is reduced and the molding material is discharged from a plunger body.

A plurality of combined data for each group of a group 2 in FIG. 11 generated by the combined-data generating unit 35 of the data processing device 25 are as shown in FIG. 12B when being plotted in the coordinate system in which the first target data and the second target data are set as the coordinate axes. As shown in FIG. 12B, by reducing the angle of the swash plates after once increasing the angle of the swash plates, the mold closing force gradually decreases when the molding material is discharged from the plunger bodies 58*a* and 59*a*.

However, when FIG. 12A and FIG. 12B are compared, a relation of the mold closing force with respect to the angle of the swash plates has hysteresis. That is, a mold closing force in reducing the angle of the swash plates is slightly lager than a mold closing force in increasing the angle of the swash plate.

Concerning a group 3 and a group 4 in FIG. 11, similarly, a plurality of combined data can be plotted in the coordinate system in which the first target data and the second target data are set as the coordinate axes. A relation between the groups 3 and 4 is substantially the same as the relation between the groups 1 and 2. However, because individual fluctuation of the pumps 58*b* and 59*b* is present, the group 1 and the group 3 show different values and the group 2 and the group 4 show different values.

The threshold determining unit 37*a* of the data processing device 25 acquires, for each group, a plurality of combined data for each group as threshold determination targets. As shown in FIGS. 12A and 12B, the threshold determining unit 37*a* plots, in the coordinate system in which the first target data and the second target data are set as the coordinate axes, a coordinate represented by the first target data and the second target data included in the combined data for each group acquired as the threshold determination target.

Figure 13A:
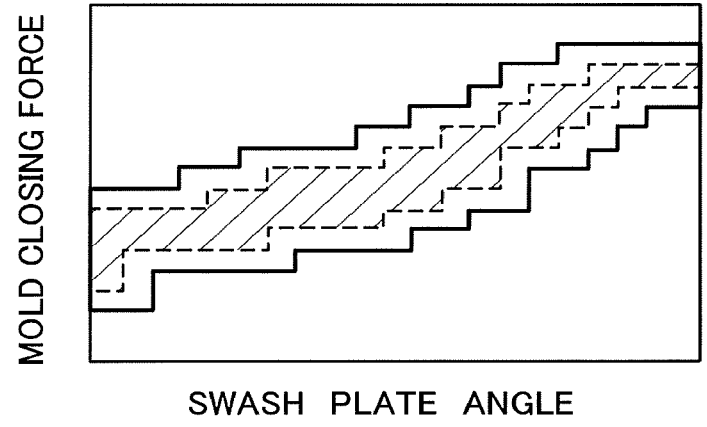
FIG. 13A is a diagram showing a threshold, which is a boundary of a normal range at the time when the angle of the swash plate of the pump is increased and the molding material is injected into the mold.
Figure 13B:
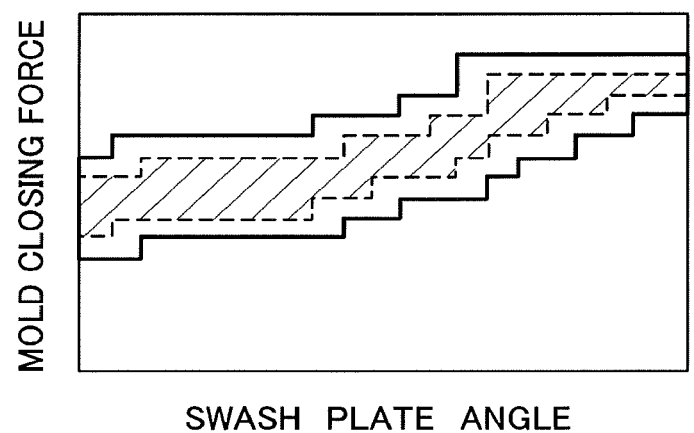
FIG. 13B is a diagram showing a threshold, which is a boundary of a normal range, at the time when the angle of the swash plate of the pump is reduced and the molding material is discharged from the plunger body.

As shown in FIGS. 13A and 13B, the threshold determining unit 37a determines, for each group, a threshold for specifying a normal range in the coordinate system. In FIG. 13A, a threshold in increasing the angle of the swash plates is indicated by a solid line. A range surrounded by hatching is a range in which data of the group 1 acquired as the threshold determination target is present. In FIG. 13B, a threshold, which is a boundary of a normal range, in reducing the angle of the swash plates is indicated by a solid line. A range surrounded by hatching is a range in which data of the group 2 acquired as the threshold determination target is present. That is, in the thresholds, allowable ranges are provided with respect to the range in which the acquired data is actually present. In this way, the thresholds can be automatically and easily set.

The determining unit 37b of the data processing device 25 acquires combined data for each group as an evaluation target after determining the threshold. As shown in FIGS. 13A and 13B, the determining unit 37b plots, in a coordinate system of the group corresponding to the evaluation target, an evaluation target coordinate represented by the first target data and the second target data included in the combined data for each group acquired as the evaluation target.

When the evaluation target coordinate is outside the normal range, the determining unit 37b determines that abnormality is present in a state concerning the group of the production equipment 1, that is, the target pumps 58b and 59b and rotating directions of the pumps 58b and 59b. The abnormality determination can be appropriately performed by an automatically set threshold.

4. Others

In the embodiment, the tool 15, the machining process, the pumps 58b and 59b, the rotating directions of the pumps 58b and 59b, and the like are described as the examples of the reference for grouping. Besides, as the reference for grouping, components operating in the production equipment 1, 50, units in an operation program for operating the production equipment 1, 50, and the like can also be applied. As the reference for grouping, data detected by a detector can also be applied. The target data is not limited to one type and two types. The target data may include three or more types.

The data processing device 25 can be connected to the PLC 22, the CNC device 21, an external device, and the like by a network protocol such as the Ethernet (registered trademark) or a bus (a computer). The data processing device 25 can acquire, as the target data, data concerning the production equipment 1, 50, other production equipment peripheral devices such as a conveying device, and the like and can acquire ON/OFF states in connected production equipment and various devices. These target data can be set as targets of the grouping. The data can be set as reference data serving as references for the grouping of data. For example, based on the ON/OFF states, the data from the ON state to the OFF state can be set as a grouping unit.

5. Fourth Embodiment (5-1. Configuration of Production Equipment 100)

Production equipment 100 is equipment that produces a predetermined production target object W. The production equipment 100 includes various types of equipment such as a machine tool, an injection molding machine, a casting machine, a conveying device, and an industrial robot. For example, in the machine tool, the production target object W is a workpiece, which is a machining target.

An example of the production equipment 100 is explained with reference to FIGS. 14 and 15. The production equipment 100 is a machine tool that machines a workpiece in a production line. A lateral machining center is explained as an example. Note that, as the configuration of the machining center functioning as the production equipment 100, various publicly-known configurations can be adopted besides a configuration explained below.

The machining center is configured, for example, as explained below. A bed 111 is fixed to a setting surface. A Z-axis saddle 112 is supported on the bed 111 to be movable in the Z-axis direction (the left-right direction in FIG. 14). A column 113 is supported on an upper surface of the Z-axis saddle 112 to be movable in the X-axis direction (the paper surface front-rear direction in FIG. 14). A Y-axis saddle 114 is supported on the right surface in FIG. 14 of the column 113 to be movable in the Y-axis direction (the up-down direction in FIG. 14).

Figure 15:
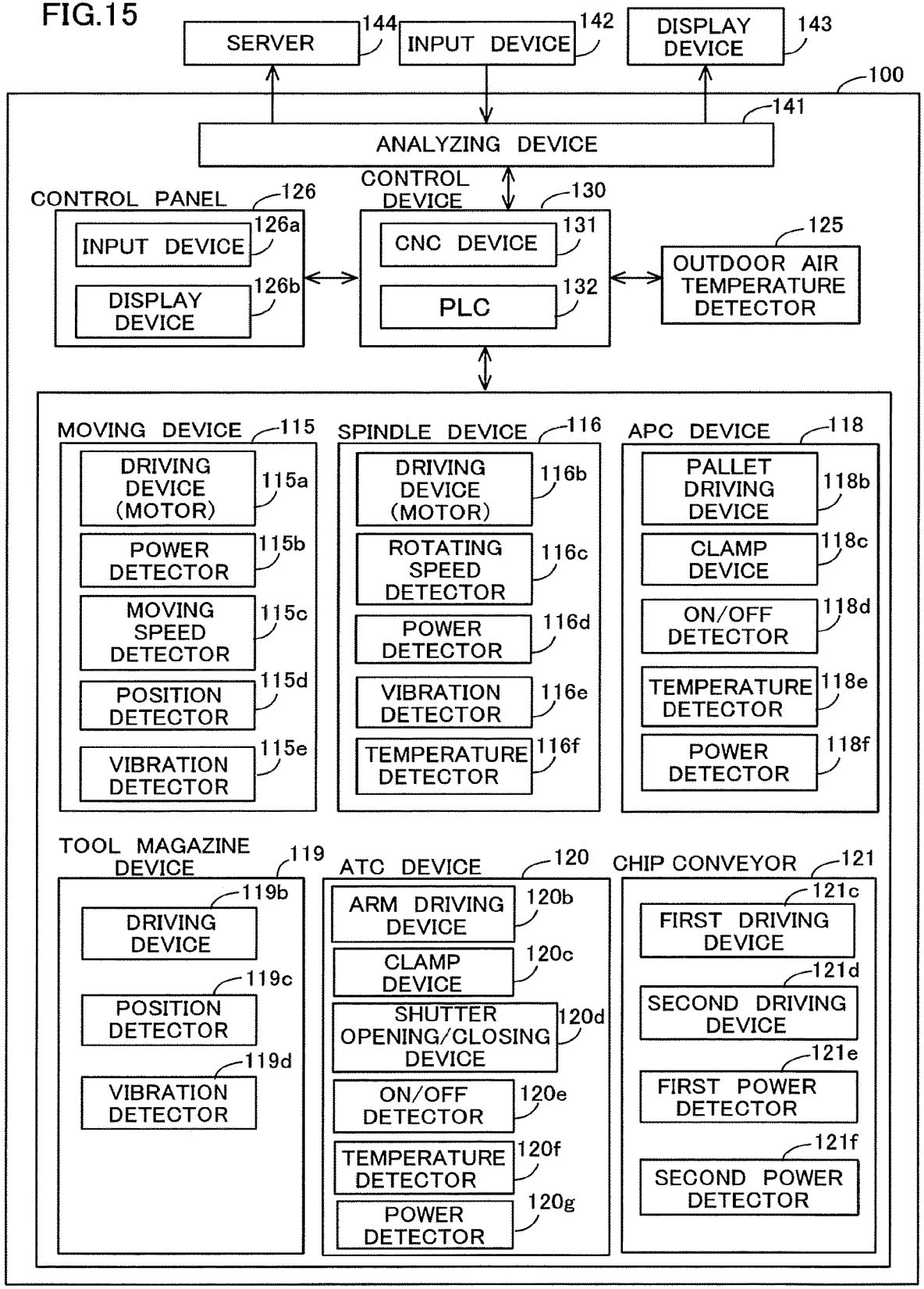
FIG. 15 is a diagram showing a functional block concerning the production equipment.

As shown in FIG. 15, a moving device 115 for moving the Z-axis saddle 112, the column 113, and the Y-axis saddle 114 (hereinafter collectively referred to as "moving bodies") is provided. The moving device 115 includes a driving device 115a (e.g., a motor) for moving the moving bodies 112, 113, and 114, a power detector 115b for detecting power (e.g., torque) of the driving device 115a, a moving speed detector 115c for detecting moving speeds of the moving bodies 112, 113, and 114, a position detector 115d for detecting positions of the moving bodies 112, 113, and 114, and a vibration detector 115e for detecting vibrations of the moving bodies 112, 113, and 114.

Figure 14:
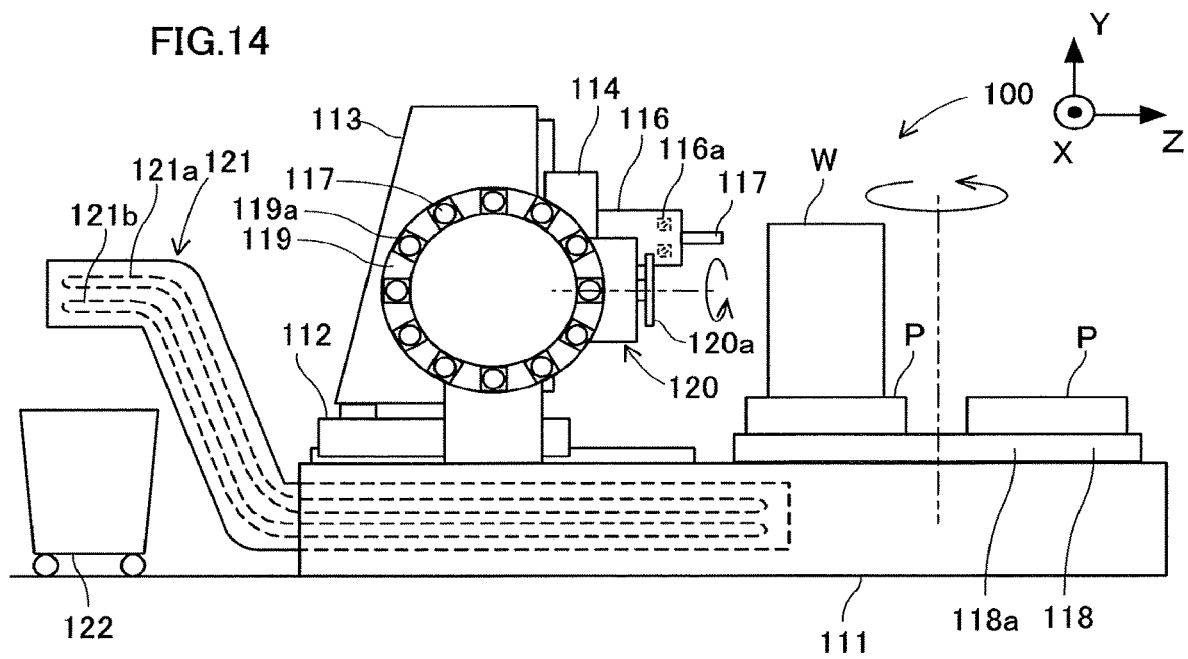
FIG. 14 is a diagram showing a machining center, which is production equipment.

As shown in FIG. 14, a spindle device 116 is provided in the Y-axis saddle 114. A spindle (not shown in FIG. 14), which is a rotating body in the spindle device 116, is provided rotatably by a bearing 116a. A tool 117 is held by the spindle. The spindle device 116 has a rotation structure in which lubricant is supplied to the bearing 116a.

The spindle device 116 further includes, as shown in FIG. 15, a driving device 116b (e.g., a motor) for driving to rotate the spindle, a rotating speed detector 116c for detecting rotating speed of the spindle, a power detector 116d for detecting power (e.g., torque) of the driving device 116b, a vibration detector 116e for detecting vibration of the spindle device 116, and a temperature detector 116f for detecting temperature of lubricant discharged from the bearing 116a or temperature of exhaust (hereinafter referred to as "temperature of exhaust and the like") in a pipe of the lubricant discharged from the bearing 116a.

On the bed 111, an automatic pallet exchange device 118 (hereinafter referred to as "APC device") is provided rotatably around a vertical axis in a position opposed to the Z-axis saddle 112 and the column 113 in the Z-axis direction (the left-right direction in FIG. 14). The APC device 118 includes a pallet body 118a that detachably holds pallets P respectively in two places on the upper surface of the pallet body 118a. A workpiece, which is the production target object W, is placed on the pallet P. That is, the pallets P can be exchanged in a machining position on the column 113 side (the left side in FIG. 14) and a preparation position on a far side from the column 113 (the right side in FIG. 14) in the APC device 118.

The APC device 118 further includes, as shown in FIG. 15, a pallet driving device 118b (e.g., a motor) for driving to rotate the pallet body 118a, a clamp device 118c for the pallet body 118a to perform a clamp operation and an unclamp operation of the pallet P using fluid pressure as a driving source, an ON/OFF detector 118d for detecting the clamp operation and the unclamp operation, a temperature detector 118e for detecting temperature of fluid of the clamp device 118c, and a power detector 118f for detecting power (e.g., torque) of the pallet driving device 118b. For example, a motor is applied as the pallet driving device 118b. For example, a cylinder device using fluid pressure as a driving source is applied as the clamp device 118c.

Further, as shown in FIG. 14, a tool magazine device 119 is provided on a side of the column 113 (the near side in FIG. 14) on the bed 111. The tool magazine device 119 includes a plurality of tool housing tools 119a for housing a plurality of tools 117. The tool magazine device 119 includes, as shown in FIG. 15, a driving device 119b for driving to rotate the plurality of tool housing tools 119a, a position detector 119c for detecting positions of the tool housing tools 119a, and a vibration detector 119d for detecting vibration of a member that supports the tool housing tool 119a.

As shown in FIG. 14, an automatic tool exchange device 120 (hereinafter referred to as "ATC device") is provided. The ATC device 120 includes a rotatable ATC arm 120a. The ATC device 120 exchanges the tool 117 of a designated tool number among the plurality of tools 117 housed in the tool magazine device 119 and the tool 117 held by the spindle device 116. The ATC device 120 includes, as shown in FIG. 15, an arm driving device 120b (e.g., a motor) for driving to rotate the ATC arm 120a, a clamp device 120c for performing a clamp operation and an unclamp operation for the tool 117 using fluid pressure as a driving source, a shutter opening/closing device 120d that performs, using fluid pressure as a driving source, opening and closing of a shutter (not shown in FIG. 14) that partitions a machining region and a region on the tool magazine device 119 side, an ON/OFF detector 120e for detecting the clamp operation and the unclamp operation of the clamp device 120c and opening and closing of the shutter, a temperature detector 120f for detecting temperatures of fluid in the clamp device 120c and the shutter opening/closing device 120d, and a power detector 120g for detecting power (e.g., torque) of the arm driving device 120b. For example, a motor is applied as the arm driving device 120b. For example, a cylinder device using fluid pressure as a driving source is applied as the clamp device 120c and the shutter opening/closing device 120d.

Further, as shown in FIG. 14, in the production equipment 100, a chip conveyor 121 for discharging chips caused by cutting is provided. The chip conveyor 121 includes a first conveyor 121a for discharging large chips and a second conveyor 121b for discharging small chips. The discharged chips are stored in a chip basket 122. As shown in FIG. 15, the chip conveyor 121 includes a first driving device 121c for driving the first conveyor 121a, a second driving device 121d for driving the second conveyor 121b, a first power detector 121e for detecting power of the first driving device 121c, and a second power detector 121f for detecting power of the second driving device 121d.

Further, the machining center, which is the production equipment 100, includes, as shown in FIG. 15, an outdoor air temperature detector 125 for detecting an outdoor air temperature around the production equipment 100. The outdoor air temperature detector 125 is used for abnormality detection explained below or used for thermal displacement correction and the like.

Further, a control panel 126 to be operated by the operator is provided. The control panel 126 includes an input device 126a for input by the operator and a display device 126b for displaying various kinds of information concerning the machining center.

Further, the machining center, which is the production equipment 100, includes, as shown in FIG. 15, a control device 130 for controlling the moving device 115, the spindle device 116, the APC device 118, the tool magazine device 119, the ATC device 120, and the chip conveyor 121. The control device 130 includes a CNC (Computerized Numerical Control) device 131 and a PLC (Programmable Logic Controller) 132.

The CNC device 131 controls the devices 115, 116, 118, 119, 120, and 121 according to an NC program. The PLC 132 performs sequence control according to a ladder circuit, a sequential function chart (SFC), or the like.

Further, in the machining center, which is the production equipment 100, an analyzing device 141 (a data processing device) is provided. The analyzing device 141 acquires detection data of the detectors provided in the production equipment 100 (equivalent to data concerning the production equipment 100), control data in the CNC device 131, I/O data stored in an I/O memory in the PLC 132, and the like.

The analyzing device 141 is, for example, disposed on the inner side on the bed 111 or housed in a housing of a control board (not shown in FIG. 15) including the control device 130. The analyzing device 141 is connected to the CNC device 131 and the PLC 132. For example, the analyzing device 141 includes a LAN connector and a USB connector. The analyzing device 141 is connected to the CNC device 131 and the PLC 132. That is, the analyzing device 141 is connected to the CNC device 131 and the PLC 132 by the Ethernet (registered trademark), the EtherCAT (registered trademark), or the like. That is, the analyzing device 141 communicates with the CNC device 131 and the PLC 132 using, for example, a network protocol of low-order two layers (a physical layer and a data link layer) of an OSI reference model.

In general, as the Internet protocol suite, a protocol of a third layer (a network layer) or a higher-order layer of the OSI reference model is used. A data transfer rate by the physical layer and the data link layer is high compared with a data transfer rate by the Internet Protocol Suite.

The analyzing device 141 in this embodiment configures edge computing connected by a protocol of a low-order layer near a communication target (the CNC device 131 and the PLC 132). Note that the edge computing is used as an appellation compared with cloud computing in which the Internet protocol suite is used.

An input device 142 and a display device 143 can be detachably connected to the analyzing device 141 as external devices. Therefore, the analyzing device 141 includes a terminal for connecting the analyzing device 141 to the display device 143. The input device 142 inputs and edits setting content of the analyzing device 141. The display device 143 can display processing content by the analyzing device 141. Note that the analyzing device 141 may include the input device 142 and the display device 143.

Further, the analyzing device 141 can transmit data such as a processing result to the server 144 by using a LAN connector to connect the analyzing device 141 to a server or the like.

Note that the analyzing device 141 is explained as a device separate from the CNC device 131 and the PLC 132. However, the analyzing device 141 can be a system incorporating the CNC device 131, the PLC 132, and the like and can also be a personal computer, a server, or the like disposed in a position separate from the production equipment 100.

(5-2. Configuration of the Analyzing Device 141)

Figure 16:
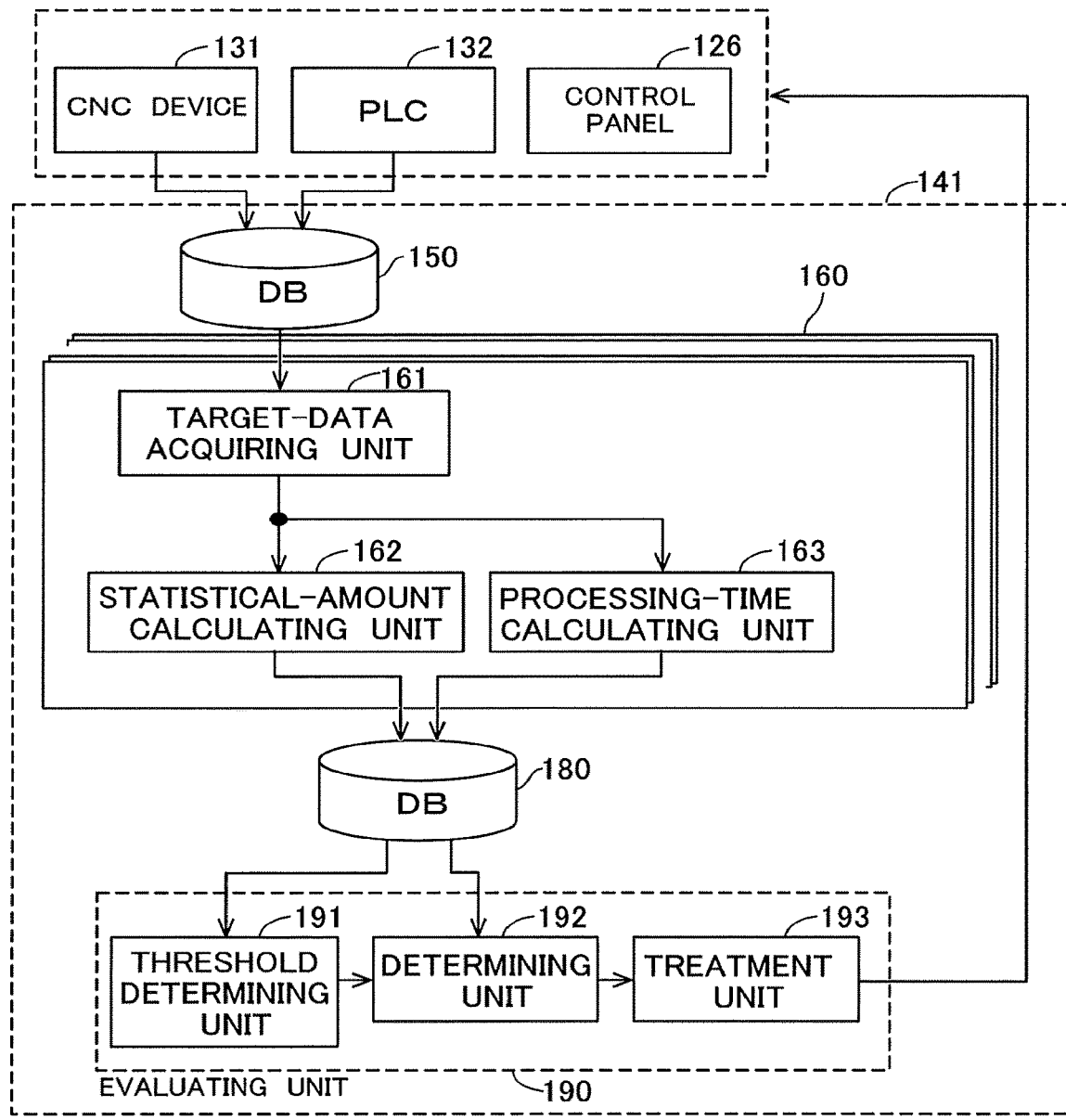
FIG. 16 is a diagram showing a first functional block concerning an analyzing device.
Figure 17:
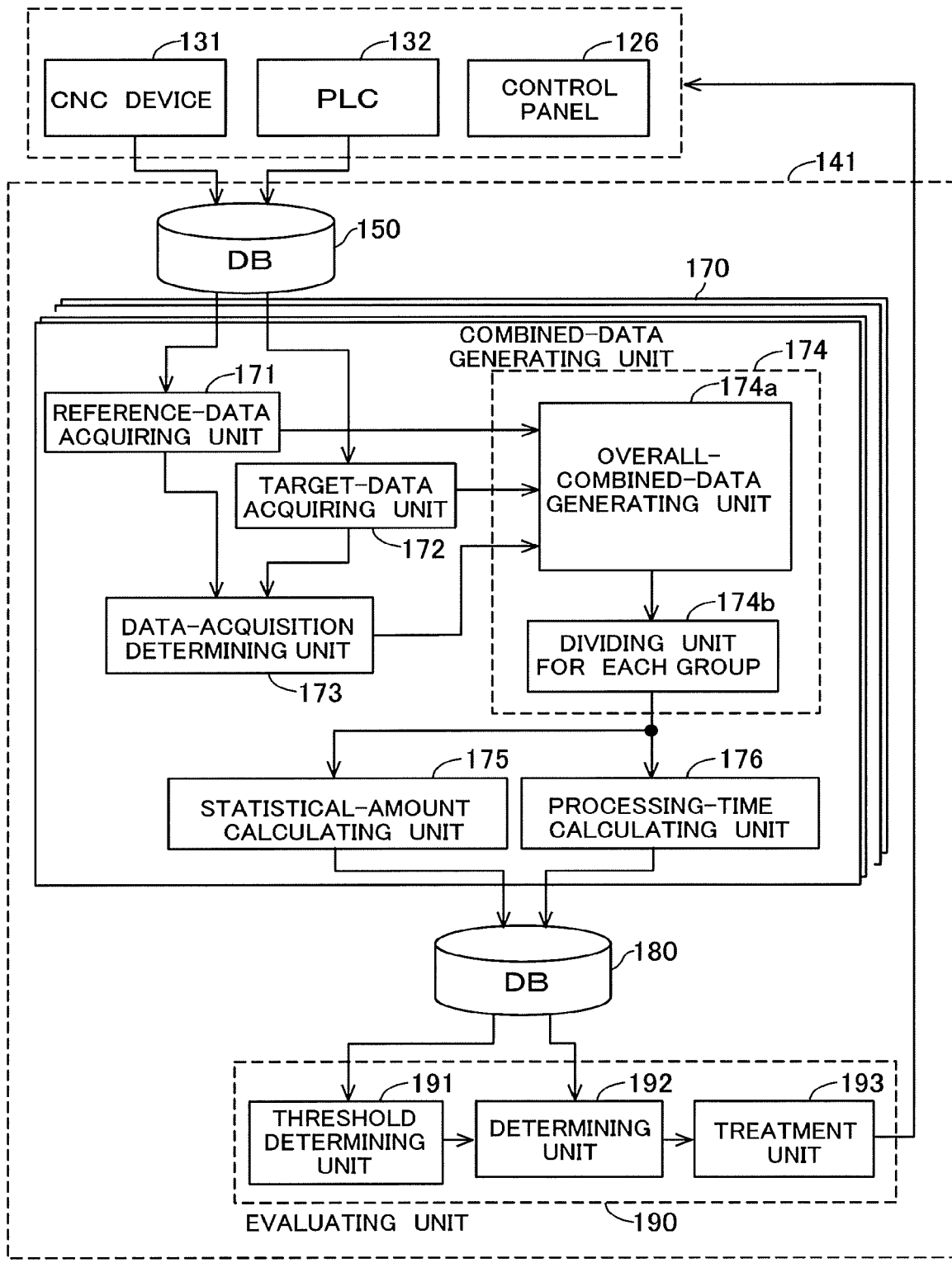
FIG. 17 is a diagram showing a second functional block concerning the analyzing device.

The configuration of the analyzing device 141 is explained with reference to FIGS. 16 and 17. As shown in FIGS. 16 and 17, the analyzing device 141 includes a first database 150, a plurality of first data processing units 160, a plurality of second data processing units 170, a second database 180, and an evaluating unit 190.

The first database 150 acquires and stores data of a preset type among the data stored by the CNC device 131 and the PLC 132. Data detected by the detectors is stored in the first database 150 via the CNC device 131 and the PLC 132. Further, in the first database 150, data used for control by the CNC device 131 and I/O data used for control of the PLC 132 are stored.

For example, the machining center can cause the first database 150 to store various data detected in actual machining of a workpiece. However, to detect more stable data, in this embodiment, the machining center carries out a machining operation for data detection in a state in which a workpiece is absent and causes the first database 150 to store data detected by the detectors. The machining operation for data detection is performed, for example, once in the beginning of a day. Note that the various data may be saved in a storage medium as a data file or the like or may be added every time the various data are acquired.

The plurality of first data processing units 160 respectively perform preset processing. Each of the first data processing units 160 generates, using the data stored in the first database 150, data for evaluating a state of the production equipment 100. The first data processing units 160 respectively generate, for example, data appropriate for evaluating abnormality or a sign of abnormality concerning the bearing 116a of the spindle device 116, the clamp device 118c of the APC device 118, the clamp device 120c of the ATC device 120, the shutter opening/closing device 120d, and the first driving device 121c and the second driving device 121d of the chip conveyor 121. Note that, in the following explanation, abnormality is used as meaning including abnormality and a sign of abnormality.

The first data processing unit 160 includes a target-data acquiring unit 161, a statistical-amount calculating unit 162, and a processing-time calculating unit 163. The target-data acquiring unit 161 acquires target data concerning a state of the production equipment 100 detected by a detector provided in the production equipment 100. The target data includes time (date and time) when the state of the production equipment 100 is detected and detection data detected by the detector at the time.

The statistical-amount calculating unit 162 calculates, using a statistical method, statistical amounts concerning the data acquired by the target-data acquiring unit 161. By using the statistical amounts as evaluation indexes, normality/abnormality of a state of a driving device of the production equipment 100 can be evaluated.

The statistical amounts mean numerical values obtained by summarizing characteristics of the data by applying the statistical method (a statistical algorithm). The statistical method is calculation of a maximum peak value in a frequency analysis result of FFT (Fast Fourier Transform), DFT (Discrete Fourier Transform), or the like, calculation of a peak-to-peak value in the frequency analysis result, calculation of a root-mean-square (RMS), calculation of a maximum, calculation of an average, calculation of a standard deviation, or the like. In the above explanation, the statistical amounts are a maximum peak value in the frequency analysis result, width between a maximum peak and a minimum peak in the frequency analysis result, a value of a root-mean-square, a maximum, an average, a value of a standard deviation, and width between a maximum peak and a minimum peak.

The processing-time calculating unit 163 calculates, based on the data acquired by the target-data acquiring unit 161, an operation processing time from operation start time to operation completion time by the driving device of the production equipment 100. The operation processing time is long when the driving device is abnormal compared with when the driving device is normal. Therefore, the operation processing time can be set as an evaluation index.

The plurality of second data processing units 170 respectively perform preset processing. However, the second data processing units 170 perform processing different from the processing performed by the first data processing units 160. Each of the second data processing units 170 generates, using the data stored in the first database 150, data for evaluating a state of the production equipment 100. For example, the second data processing unit 170 respectively generates, for example, data appropriate for evaluating abnormality concerning the bearing 116a of the spindle device 116, the clamp device 118c of the APC device 118, the clamp device 120c and the shutter opening/closing device 120d of the ATC device 120, and the first driving device 121c and the second driving device 121d of the chip conveyor 121.

The second data processing unit 170 includes a reference-data acquiring unit 171, a target-data acquiring unit 172, a data-acquisition determining unit 173, a combined-data generating unit 174, a statistical-amount calculating unit 175, and a processing-time calculating unit 176. The reference-data acquiring unit 171 acquires reference data including information concerning time in which a reference for grouping of data (e.g., the spindle device 116) operates in the production equipment 100. The reference data includes time (date and time) when the reference operates. Note that the reference data is control data by the control device 130 in some cases and is detection data detected by the detector in other cases.

The target-data acquiring unit 172 acquires target data concerning a state of the production equipment 100 detected by the detector provided in the production equipment 100. The target data includes time (date and time) when the state of the production equipment 100 is detected and detection data detected by the detector at the time. The data-acquisition determining unit 173 determines based on a preset algorithm that the reference-data acquiring unit 171 acquires the reference data and the target-data acquiring unit 172 acquires the target data.

When the data-acquisition determining unit 173 determines that the reference data and the target data are acquired, the combined-data generating unit 174 starts generation of combined data for each group. The combined data for each group is data obtained by combining, for each group of the reference data, with the reference data, data detected in the same period of time as an operation period of time of the reference data in the target data.

The combined-data generating unit 174 includes an overall-combined-data generating unit 174a and a dividing unit for each group 174b. The overall-combined-data generating unit 174a acquires reference data and target data from the reference-data acquiring unit 171 and the target-data acquiring unit 172. Subsequently, the overall-combined-data generating unit 174*a* generates overall combined data obtained by associating the acquired reference data and the acquired target data according to an operation time of the reference data and a detection time of the target data and combining the reference data and the target data. The dividing unit for each group 174*b* divides or extracts, for each group, the overall combined data based on a group of the reference data in the overall combined data to thereby generate, for each group, combined data for each group.

The statistical-amount calculating unit 175 calculates, using the statistical method, statistical amounts concerning the combined data for each group generated by the dividing unit for each group 174*b*. By using the statistical amounts as evaluation indexes, normality/abnormality of a state of the driving device of the production equipment 100 can be evaluated. The statistical amounts are as explained above.

The processing-time calculating unit 176 calculates, based on the combined data for each group generated by the dividing unit for each group 174*b*, an operation processing time from operation start time to operation completion time by the driving device of the production equipment 100. The operation processing time is long when the driving device is abnormal compared with when the driving device is normal. Therefore, the operation processing time can be set as an evaluation index.

The second database 180 stores the statistical amounts and the operation processing time generated by the statistical-amount calculating unit 162 and the processing-time calculating unit 163 of each of the plurality of first data processing units 160. Further, the second database 180 stores the statistical amounts and the operation processing time generated by the statistical-amount calculating unit 175 and the processing-time calculating unit 176 of each of the plurality of second data processing units 170. The processing explained above is continued, whereby statistical amounts and operation processing times for a plurality of workpieces are stored in the second database 180.

The evaluating unit 190 includes a threshold determining unit 191 that determines thresholds based on the statistical amounts and the operation processing time stored in the second database 180 as threshold determination targets. Further, the evaluating unit 190 includes a determining unit 192 that determines a state of the driving device of the production equipment 100 based on the thresholds and the statistical amounts and the operation processing time stored in the second database 180 as determination targets. The determining unit 192 compares the thresholds and the statistical amounts or the operation processing time set as the determination target and determines the state of the driving device.

Further, the evaluating unit 190 includes a treatment unit 193 that carries out treatment corresponding to a result of the determination of the determining unit 192. For example, when an evaluation target part of the production equipment 100 is abnormal as the state of the driving device of the production equipment 100, the treatment unit 193 performs treatment corresponding to the part and corresponding to the abnormality. For example, the treatment unit 193 performs warning display on the control panel 126 or performs control stop treatment on the CNC device 131 or the PLC 132.

(5-3. Illustration of the Data Processing Units 160 and 170 and the Evaluating Unit 190)

(5-3-1. Processing Concerning the Spindle Device 116)

Processing concerning the spindle device 116 in the first data processing unit 160 and the evaluating unit 190 shown in FIG. 16 is explained with reference to FIGS. 16 and 17. Concerning the spindle device 116, the target-data acquiring unit 161 in the first data processing unit 160 acquires a temperature of exhaust and the like of the bearing 116*a* detected by the temperature detector 116*f* and an outdoor air temperature detected by the outdoor air temperature detector 125.

The statistical-amount calculating unit 162 calculates statistical amounts based on target data acquired by the target-data acquiring unit 161. The target data includes time (date and time) when the temperature of exhaust and the like and the outdoor air temperature are detected and detection data detected by the detector at the time. Therefore, the statistical-amount calculating unit 162 associates a plurality of target data according to respective detection times of the plurality of target data and combines the plurality of target data.

Figure 18:
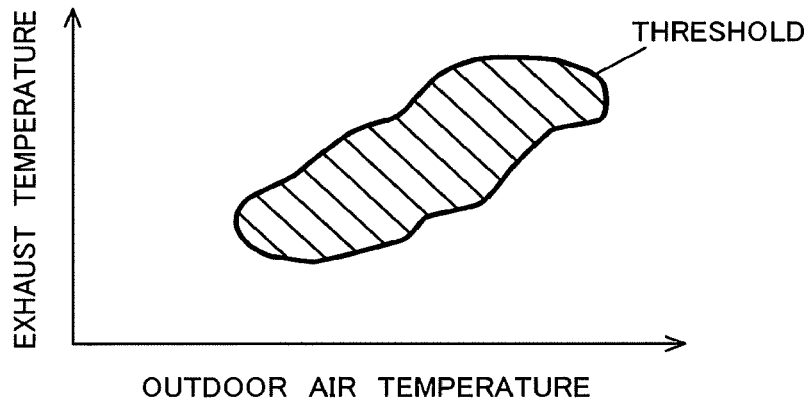
FIG. 18 is a graph showing a relation between a temperature of exhaust and the like and an outdoor air temperature in a spindle device.

As shown in FIG. 18, the statistical-amount calculating unit 162 calculates, as one of statistical amounts, a relation between the temperature of exhaust and the like and the outdoor air temperature associated by the detection times. That is, the statistical-amount calculating unit 162 plots points of the temperature of exhaust and the like and the outdoor air temperature associated by the detection times in a graph in which the temperature of exhaust and the like and the outdoor air temperature are set as axes. The temperature of exhaust and the like and the outdoor air temperature have predetermined relationship. That is, as shown in FIG. 18, when the driving device 116*b* is normal, the temperature of exhaust and the like rises as the outdoor air temperature rises. A relation between the temperature of exhaust and the like and the outdoor air temperature serving as the statistical amounts is stored in the second database 180.

As indicated by hatching in FIG. 18, the threshold determining unit 191 determines a threshold for the relation using data of the statistical amounts set as the threshold determination targets. The inside of the threshold in FIG. 18 is a range in which the driving device 116*b* is normal. The outside of the threshold is a range in which the driving device 116*b* is abnormal. The determining unit 192 determines whether the data of the statistical amounts set as determination targets is within the threshold or outside the threshold in FIG. 18. If the data is within the threshold, the determining unit 192 determines that the data of the statistical amount is normal. If the data is outside the threshold, the determining unit 192 determines that the data of the statistical amount is abnormal.

First processing concerning the spindle device 116 in the second data processing unit 170 and the evaluating unit 190 shown in FIG. 17 is explained with reference to FIGS. 17 and 19 to 21. Concerning the spindle device 116, the reference-data acquiring unit 171 in the second data processing unit 170 acquires, as reference data, rotating speed detected by the rotating speed detector 116*c*. All the reference data include time (date and time) when rotating speed serving as a reference for grouping is detected and detection data concerning the rotating speed.

The target-data acquiring unit 172 in the second data processing unit 170 acquires, as target data, vibration detected by the vibration detector 116*e*. Like the reference data, the target data includes time (date and time) when the vibration is detected and detection data. When the data-acquisition determining unit 173 determines that the reference-data acquiring unit 171 acquires the reference data and the target-data acquiring unit 172 acquires the target data, the overall-combined-data generating unit 174*a* combines the reference data and the target data. When the reference data concerning the rotating speed and the target data concerning the vibration are associated by time and combined, combined data has data structure that can be indicated by graphs in upper and lower parts of FIG. 19. Subsequently, the dividing unit for each group 174b divides and cuts vibration data in a period of time in which the rotating speed is substantially fixed, that is, vibration data of a C portion and a D portion in FIG. 19.

Figure 20:
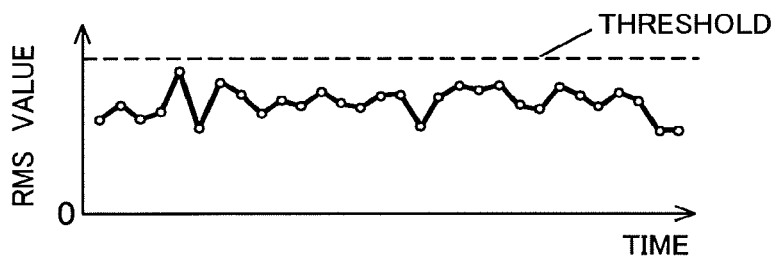
FIG. 20 is a graph showing a root-mean-square concerning the vibration in the spindle device.
Figure 21:
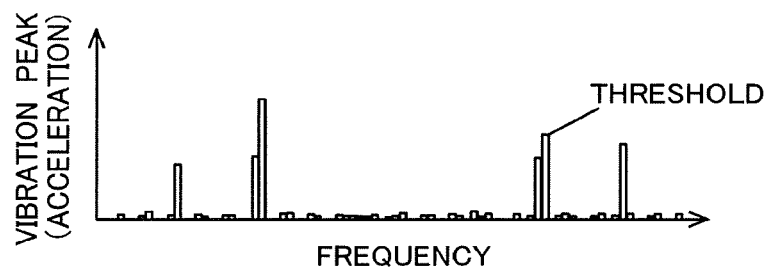
FIG. 21 is a graph showing a frequency analysis result concerning the vibration in the spindle device.

As shown in FIG. 20, the statistical-amount calculating unit 175 calculates a root-mean-square (RMS) as a statistical amount with respect to the cut vibration data. As shown in FIG. 21, the statistical-amount calculating unit 175 may perform, instead of the root-means-square, a frequency analysis such as FFT on the cut vibration data and calculate a result of the frequency analysis as a statistical amount. Besides, the statistical-amount calculating unit 175 may set a standard deviation, an average, a maximum, a minimum, and the like of the vibration data as statistical amounts concerning the vibration. In the second database 180, data concerning the vibration serving as the statistical amounts is stored.

As shown in FIG. 20, when the root-mean-square is used as the statistical amount, the threshold determining unit 191 determines a threshold using data of the statistical amounts set as threshold determination targets. With reference to a maximum of the root-mean-square, the threshold is set to a value considering an allowable range rather than the maximum. A range of the threshold or less in FIG. 20 is a range in which the driving device 116b is normal. A range larger than the threshold is a range in which the driving device 116b is abnormal. The determining unit 192 determines whether data of the statistical amounts set as determination targets is equal to or smaller than the threshold or larger than the threshold in FIG. 20. If the data is equal to or smaller than the threshold, the determining unit 192 determines that the data of the statistical amount is normal. If the data is larger than the threshold, the determining unit 192 determines that the data of the statistical amount is abnormal.

As shown in FIG. 21, when a frequency analysis result is used as a statistical amount, the threshold determining unit 191 determines a threshold for each frequency using data of the statistical amount set as a threshold determination target. The determining unit 192 determines whether data of the statistical amount set as a determination target is equal to or smaller than the threshold for each frequency in FIG. 21 or larger than the threshold. If the data is equal to or smaller than the threshold for each frequency, the determining unit 192 determines that the data of the statistical amount is normal. If the data is larger than the threshold, the determining unit 192 determines that the data of the statistical amount is abnormal.

Second processing concerning the spindle device 116 in the second data processing unit 170 and the evaluating unit 190 shown in FIG. 17 is explained with reference to FIGS. 17, 19, and 20. Concerning the spindle device 116, the reference-data acquiring unit 171 in the second data processing unit 170 acquires, as reference data, rotating speed detected by the rotating speed detector 116c. In an example explained below, based on a rotating speed command, the spindle device 116 is changed from a stop state (0 min$^{-1}$) to 2000 min$^{-1}$, changed to 4000 min$^{-1}$ after elapse of a predetermined time, and stopped after further elapse of the predetermined time.

The target-data acquiring unit 172 in the second data processing unit 170 acquires, as target data, power detected by the power detector 116d. When the data-acquisition determining unit 173 determines that the reference-data acquiring unit 171 acquires reference data and the target-data acquiring unit 172 acquires target data, the overall-combined-data generating unit 174a combines the reference data and the target data. When the reference data concerning the rotating speed and the target data concerning the power are associated by time and combined, combined data has data structure that can be indicated by graphs in upper and middle parts of FIG. 19. Subsequently, the dividing unit for each group 174b divides and cuts vibration data in a period of time in which the rotating speed changes, that is, rotating speed data and power data in an A portion and a B portion in FIG. 19.

Figure 19:
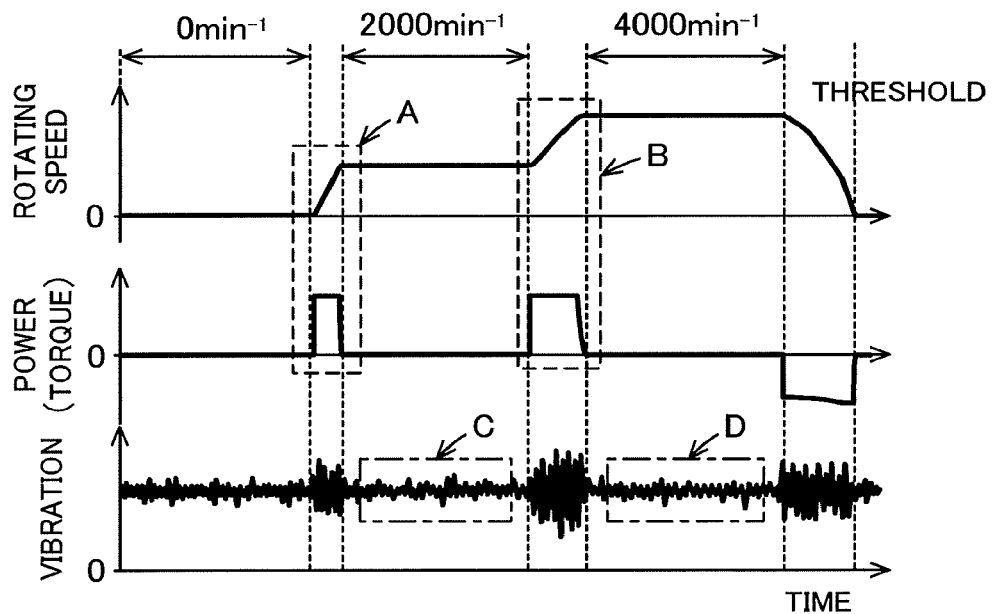
FIG. 19 is a graph concerning rotating speed, power, and vibration in the spindle device.

Concerning a rotating operation of the spindle device 116, the processing-time calculating unit 176 calculates an operation processing time based on data of the A portion in FIG. 19. In detail, the processing-time calculating unit 176 calculates an operation processing time from start time of a change of the rotating speed from 0 to 2000 min$^{-1}$ to reaching time to 2000 min$^{-1}$, that is, a required time for the rotating speed to reach 2000 min$^{-1}$ from 0. That is, time when power increases from 0 is set as operation start time, time when the power returns to 0 is set as operation completion time, and an operation processing time from the operation start time to the operation completion time is calculated.

Further, the operation processing time, which is the time required for reaching of the rotating speed, is acquired according to the rotating speed and stored in the second database 180. That is, each of an operation processing time from 0 to 2000 min$^{-1}$ and an operation processing time from 2000 to 4000 min$^{-1}$ is stored in the second database 180.

Figure 22:
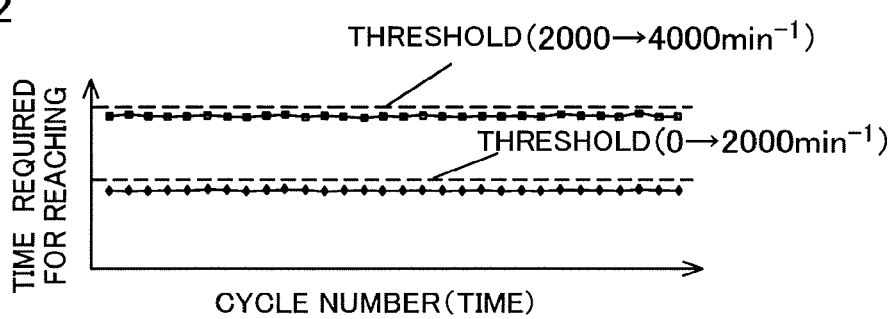
FIG. 22 is a graph concerning a time required for reaching of the rotating speed in the spindle device.

As shown in FIG. 22, the threshold determining unit 191 determines a threshold for 0 to 2000 min$^{-1}$ using data of the operation processing time of 0 to 2000 min$^{-1}$ set as a threshold determination target. Similarly, as shown in FIG. 22, the threshold determining unit 191 determines a threshold for 2000 to 4000 min$^{-1}$ using data of the operation processing time of 2000 to 4000 min$^{-1}$ set as a threshold determination target. If the operation processing time set as the determination target is equal to or smaller than the threshold corresponding to the rotating speed, the determining unit 192 determines that the operation processing time is normal. If the operation processing time is larger than the threshold, the determining unit 192 determines that the operation processing time is abnormal.

As explained above, the determining unit 192 can perform the individual determinations using the individual thresholds. Besides, the state determination of the spindle device 116 can be more highly accurately performed by using the three kinds of determination methods explained above. A determination method of the determining unit 192 in this case is explained with reference to FIG. 23.

Examples of an abnormality sign detection target are explained below. A first sign detection target is detection of a sign of a failure such as burn-in of the bearing 116a (abnormality 1 in FIG. 23). A second sign detection target is detection of a sign of a failure such as breakage or deterioration of the bearing 116a (abnormality 2 in FIG. 23). A third sign detection target is detection of a sign of a failure of the driving device 116b (the motor) (abnormality 3 in FIG. 23).

Figure 23:
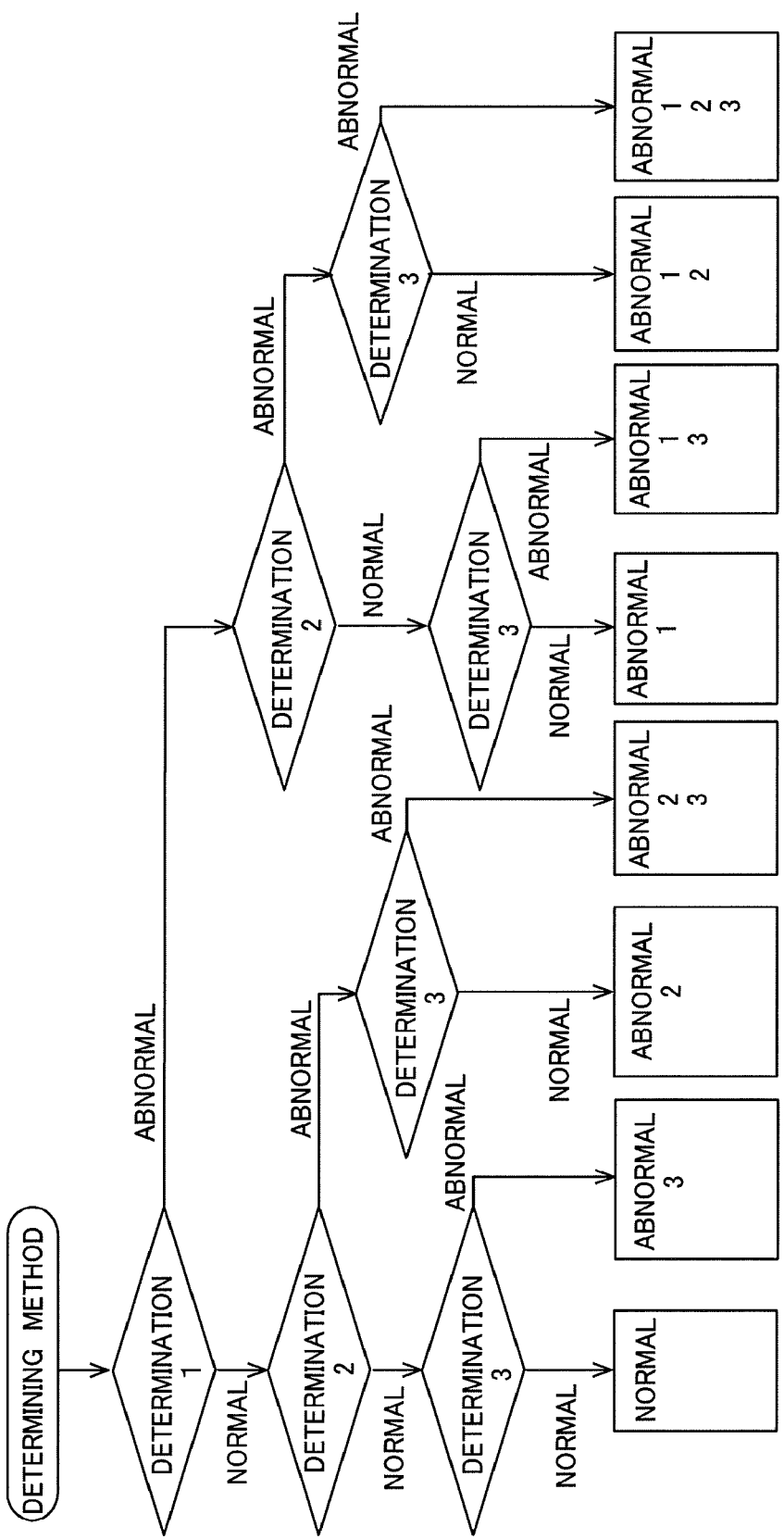
FIG. 23 is a flowchart showing a method of determining an abnormality sign detection target using a plurality of determining methods in a determining unit in the spindle device.

In FIG. 23, determination 1 is a determining method in which the relation between the temperature of exhaust and the like and the outdoor air temperature is used as the statistical amount as shown in FIG. 18. Determination 2 is a determining method in which the vibration is used as the statistical amount as shown in FIG. 20 or 21. Determination 3 is a determining method concerning the time required for reaching of the rotating speed (the operation processing time) as shown in FIG. 22.

As shown in FIG. 23, when the determination targets are determined as normal in all of the determinations 1, 2, and 3, all of the failure sign detection targets are determined as normal. When the determination targets are determined as normal in the determinations 1 and 2 and the determination target is determined as abnormal in the determination 3, the third sign detection target is determined as abnormal. When the determination targets are determined as normal in the determinations 1 and 3 and the determination target is determined as abnormal in the determination 2, the second sign detection target is determined as abnormal. When the determination target is determined as normal in the determination 1 and the determination targets are determined as abnormal in the determinations 2 and 3, the second and third sign detection targets are determined as abnormal.

When the determination targets are determined as normal in the determinations 2 and 3 and the determination target is determined as abnormal in the determination 1, the first sign detection target is determined as abnormal. When the determination target is determined as normal in the determination 2 and the determination targets are determined as abnormal in the determinations 1 and 3, the first and third sign detection targets are determined as abnormal. When the determination target is determined as normal in the determination 3 and the determination targets are determined as abnormal in the determinations 1 and 2, the first and second sign detection targets are determined as abnormal. When the determination targets are determined as abnormal in all of the determinations 1, 2, and 3, all of the failure sign detection targets are determined as abnormal.

The treatment unit 193 carries out treatment corresponding to a result of the determination of the determining unit 192. That is, a result of the determination of a state of the driving device 116b of the production equipment 100 can be suitably used.

(5-3-2. Processing Concerning the APC Device 118)

First processing concerning the APC device 118 in the data processing unit 160 and the evaluating unit 190 is explained with reference to FIGS. 16 and 24. Concerning the APC device 118, the target-data acquiring unit 161 in the first data processing unit 160 acquires the operation start signal and the operation completion signal of the clamp operation and the unclamp operation for the pallet P detected by the ON/OFF detector 118d. Further, the target-data acquiring unit 161 acquires the temperature of the fluid of the clamp device 118c detected by the temperature detector 118e.

The statistical-amount calculating unit 162 calculates a statistical amount based on the data acquired by the target-data acquiring unit 161. As shown in FIG. 24, the statistical-amount calculating unit 162 calculates, as one of statistical amounts, a relation between an operation processing time of the clamp operation and the unclamp operation and the fluid temperature of the clamp device 118c associated by a detection time. The operation processing time is a time from a clamp operation start time to a clamp operation completion time and a time from an unclamp operation start time to an unclamp operation completion time.

That is, the statistical-amount calculating unit 162 plots points of the operation processing time and the fluid temperature associated by the detection time in a graph in which the operation processing time and the fluid temperature are set as axes. As shown in FIG. 24, the operation processing time and the fluid temperature have predetermined relationship. That is, the operation processing time decreases as the fluid temperature rises. Conversely, the operation processing time increases as the fluid temperature falls. This is caused by the influence of, for example, the viscosity of the fluid in the driving device such as the cylinder device. In the second database 180, the relation between the operation processing time and the fluid temperature is stored as a statistical amount.

Figure 24:
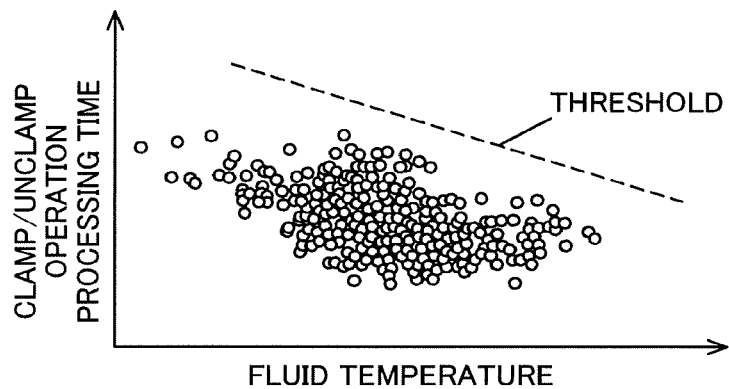
FIG. 24 is a graph showing a relation between a fluid temperature and an operation processing time of a clamp operation and an unclamp operation of a pallet driving device in an APC device.

The threshold determining unit 191 determines a threshold based on the positions of the plots shown in FIG. 24 using, for example, least squares approximation and further considering an allowable amount. The determining unit 192 determines abnormality of the clamp device 118c by comparing the threshold and data of a statistical amount set as a determination target.

Figure 25:
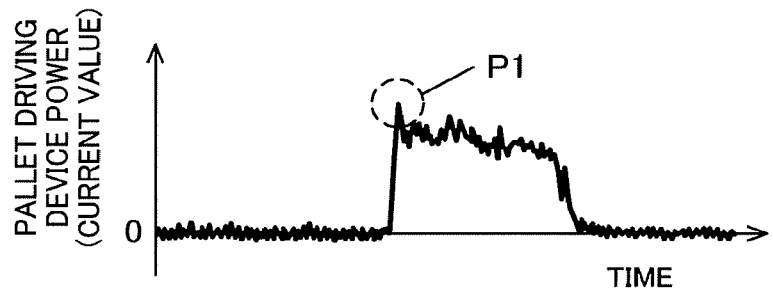
FIG. 25 is a graph concerning power of the pallet driving device in the APC device.

Second processing concerning the APC device 118 in the first data processing unit 160 and the evaluating unit 190 is explained with reference to FIGS. 16, 25, and 26. Concerning the APC device 118, the target-data acquiring unit 161 in the first data processing unit 160 acquires power (e.g., torque or a current value of a motor) of the pallet driving device 118b detected by the power detector 118f.

The statistical-amount calculating unit 162 calculates a statistical amount based on data of the power of the pallet driving device 118b acquired by the target-data acquiring unit 161. As indicated by a broken line frame in FIG. 25, the statistical-amount calculating unit 162 calculates, as a statistical amount, a peak value P1 during a start of the pallet driving device 118b in the data of the power. In the second database 180, the peak value P1 is stored as the statistical amount.

Figure 26:
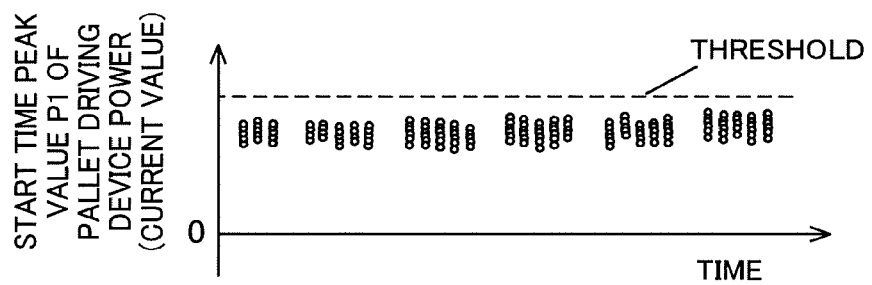
FIG. 26 is a graph concerning a peak value at a start time of the power of the pallet driving device in the APC device.

As shown in FIG. 26, the threshold determining unit 191 determines a threshold using data of the peak value P1, which is the statistical amount set as a threshold determination target. The determining unit 192 determines abnormality of the pallet driving device 118b by comparing the threshold and the data of the peak value P1, which is the statistical amount set as a determination target. The treatment unit 193 carries out treatment corresponding to a result of the determination of the determining unit 192. That is, a result of the determination of a state of the pallet driving device 118b of the production equipment 100 can be suitably used.

When the pallet driving device 118b uses a fluid pressure as a driving source, for example, as in the spindle device 116, the evaluating unit 190 acquires vibration of the vibration detector instead of the current value or the like of the motor and determines abnormality of the pallet driving device 118b.

(5-3-3. Processing Concerning the ATC Device 120).

First processing concerning the ATC device 120 in the first data processing unit 160 and the evaluating unit 190 is explained with reference to FIGS. 16 and 27. Concerning the ATC device 120, the target-data acquiring unit 161 in the first data processing unit 160 acquires an operation start signal and an operation completion signal concerning a clamp operation and an unclamp operation of the ATC arm 120a detected by the ON/OFF detector 120e. Further, the target-data acquiring unit 161 acquires the temperature of the fluid in the clamp device 120c detected by the temperature detector 120f.

The statistical-amount calculating unit 162 calculates a statistical amount based on data acquired by the target-data acquiring unit 161. As shown in FIG. 27, the statistical-amount calculating unit 162 calculates, as one of statistical amounts, a relation between an operation processing time of the clamp operation and the unclamp operation and the fluid temperature of the clamp device 120c associated by a detection time. The operation processing time is a time from a clamp operation start time to a clamp operation completion time and a time from an unclamp operation start time to an unclamp operation completion time.

That is, the statistical-amount calculating unit 162 plots points of the operation processing time and the fluid temperature associated by the detection time in a graph in which the operation processing time and the fluid temperature are set as axes. As shown in FIG. 27, the operation processing time and the fluid temperature have predetermined relationship. That is, the operation processing time decreases as the fluid temperature rises. Conversely, the operation processing time increases as the fluid temperature falls. This is caused by the influence of, for example, the viscosity of the fluid in the driving device such as the cylinder device. In the second database 180, a relation between the operation processing time and the fluid temperature is stored as a statistical amount.

Figure 27:
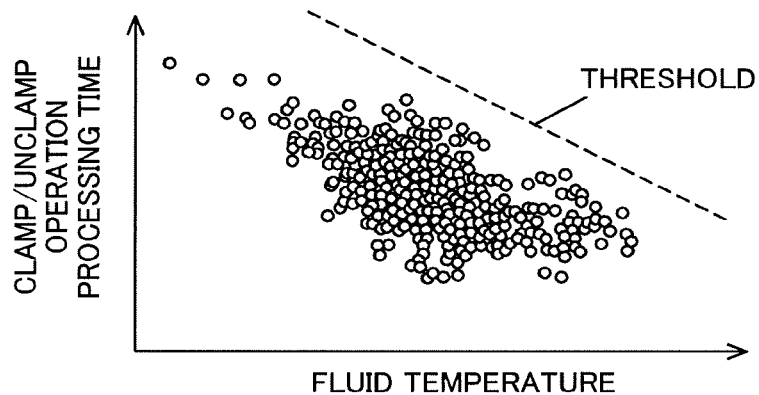
FIG. 27 is a graph showing a relation between a fluid temperature and an operation processing time of a clamp operation and an unclamp operation of an arm driving device in an ATC device.

The threshold determining unit 191 determines a threshold based on the positions of the plots in FIG. 27 using, for example, least squares approximation and further taking into account an allowable amount. The determining unit 192 determines abnormality of the clamp device 120c by comparing the threshold and data of the statistical amount set as a determination target.

Second processing concerning the ATC device 120 in the first data processing unit 160 and the evaluating unit 190 is explained with reference to FIGS. 16 and 27. Concerning the ATC device 120, the target-data acquiring unit 161 in the first data processing unit 160 further acquires an opening operation start signal, an opening operation completion signal, a closing operation start signal, and a closing operation completion signal of a shutter detected by the ON/OFF detector 120e. Further, the target-data acquiring unit 161 acquires the temperature of the fluid in the shutter opening/closing device 120d detected by the temperature detector 120f.

The statistical-amount calculating unit 162 calculates, as one of statistical amounts, a relation between the operation processing time of the opening and closing of the shutter and the fluid temperature of the shutter opening/closing device 120d associated by the detection time. The operation processing time is an operation processing time from start time to completion time of an opening operation of the shutter and an operation processing time from start time to completion time of a closing operation of the shutter. In this case, the statistical amount and the threshold concerning the shutter opening/closing device 120d are as shown in FIG. 27 like the statistical amount and the threshold concerning the clamp device 120c. The same applies to the determining unit 192.

Figure 28:
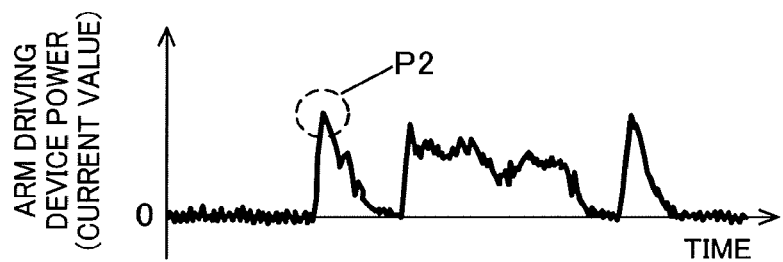
FIG. 28 is a graph concerning power of the arm driving device in the ATC device.

Third processing concerning the ATC device 120 in the first data processing unit 160 and the evaluating unit 190 is explained with reference to FIGS. 16, 28, and 29. Concerning the ATC device 120, the target-data acquiring unit 161 in the first data processing unit 160 acquires power (e.g., torque or a current value of the motor) of the arm driving device 120b detected by the power detector 120g.

The statistical-amount calculating unit 162 calculates a statistical amount based on data of the power of the arm driving device 120b acquired by the target-data acquiring unit 161. As indicated by a broken line frame in FIG. 28, the statistical-amount calculating unit 162 calculates, as a statistical amount, a peak value P2 during a start of the arm driving device 120b in the data of the power. In the second database 180, the peak value P2 is stored as a statistical amount.

Figure 29:
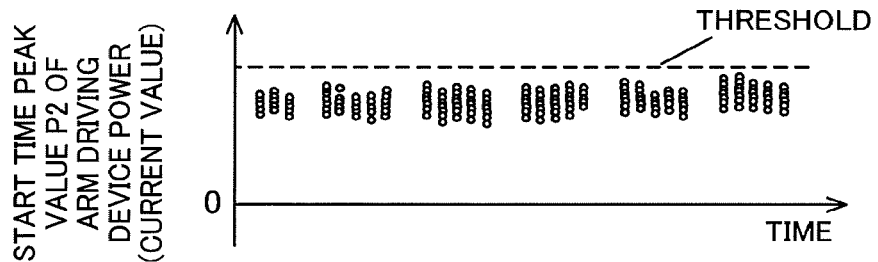
FIG. 29 is a graph concerning a peak value at a start time of the power of the arm driving device in the ATC device.

As shown in FIG. 29, the threshold determining unit 191 determines a threshold using data of the peak value P2, which is the statistical amount set as a threshold determination target. The determining unit 192 determines abnormality of the arm driving device 120b by comparing the threshold and the data of the peak value P2, which is the statistical amount set as a determination target.

The determining unit 192 can perform the individual determinations using the individual thresholds as explained above. Besides, the state determination of the ATC device 120 can be more highly accurately performed by using the three kinds of determination methods explained above. A determination method of the determining unit 192 in this case is explained with reference to FIG. 23.

Examples of an abnormality sign detection target are explained below. A first sign detection target is detection of a sign of a failure such as deterioration or breakage of the shutter opening/closing device 120d of the shutter (the abnormality 1 in FIG. 23). A second sign detection target is detection of a sign of a failure such as deterioration or breakage of the clamp device 120c (the abnormality 2 in FIG. 23). A third sign detection target is detection of a sign of a failure of the arm driving device 120b (the motor) (the abnormality 3 in FIG. 23).

In FIG. 23, the determination 1 is a determining method in which the relation between the operation processing time of the opening and closing of the shutter and the fluid temperature is used as the statistical amount. The determination 2 is a determining method in which the relation between the operation processing time of the clamp operation and the unclamp operation of the clamp device and the fluid temperature is used as the statistical amount as shown in FIG. 27. The determination 3 is a determining method concerning the peak value P2 during the start of the power of the arm driving device 120b as shown in FIG. 29.

As shown in FIG. 23, when the determination targets are determined as normal in all of the determinations 1, 2, and 3, all of the failure sign detection targets are determined as normal. When the determination targets are determined as normal in the determinations 1 and 2 and the determination target is determined as abnormal in the determination 3, the third sign detection target is determined as abnormal. When the determination targets are determined as normal in the determinations 1 and 3 and the determination target is determined as abnormal in the determination 2, the second sign detection target is determined as abnormal. When the determination target is determined as normal in the determination 1 and the determination targets are determined as abnormal in the determinations 2 and 3, the second and third sign detection targets are determined as abnormal.

When the determination targets are determined as normal in the determinations 2 and 3 and the determination target is determined as abnormal in the determination 1, the first sign detection target is determined as abnormal. When the determination target is determined as normal in the determination 2 and the determination targets are determined as abnormal in the determinations 1 and 3, the first and third sign detection targets are determined as abnormal. When the determination target is determined as normal in the determination 3 and the determination targets are determined as abnormal in the determinations 1 and 2, the first and second sign detection targets are determined as abnormal. When the determination targets are determined as abnormal in all of the determinations 1, 2, and 3, all of the failure sign detection targets are determined as abnormal.

The treatment unit 193 carries out treatment corresponding to a result of the determination of the determining unit

192. That is, a result of the determination of a state of the ATC device 120 of the production equipment 100 can be suitably used.

(5-3-4. Processing Concerning the Chip Conveyor 21)

Processing concerning the chip conveyor 121 in the first data processing unit 160 and the evaluating unit 190 is explained with reference to FIGS. 16 and 30 to 34. Concerning the chip conveyor 121, the target-data acquiring unit 161 in the first data processing unit 160 acquires power (e.g., torque or a current value of a motor) of the first driving device 121c and the second driving device 121d detected by the first power detector 121e and the second power detector 121f.

Figure 30:
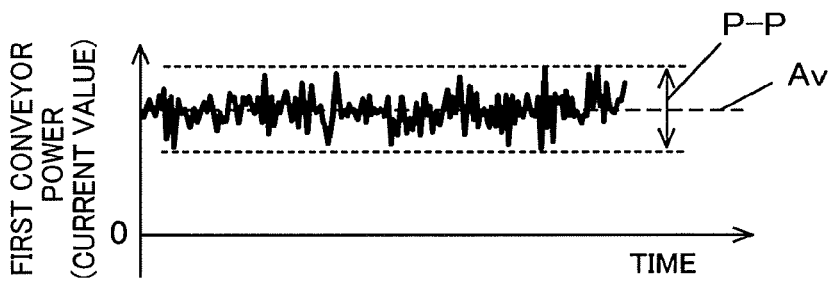
FIG. 30 is a graph concerning power of a first conveyor in a chip conveyor.

The statistical-amount calculating unit 162 calculates a statistical amount based on data of the power of the first driving device 121c and the second driving device 121d acquired by the target-data acquiring unit 161. As shown in FIG. 30, the statistical-amount calculating unit 162 calculates, as a statistical amount, an average Av and a peak-to-peak value P-P in the first driving device 121c in the data of the power. The statistical-amount calculating unit 162 calculates, as a statistical amount, the average Av and the peak-to-peak value P-P in the second driving device 121d in the data of the power. Note that the peak-to-peak value is a difference between a maximum peak value and a minimum peak value. In the second database 180, the average Av and the peak-to-peak value P-P of the first driving device 121c and the average Av and the peak-to-peak value P-P of the second driving device 121d are stored as the statistical amounts.

Figure 31:
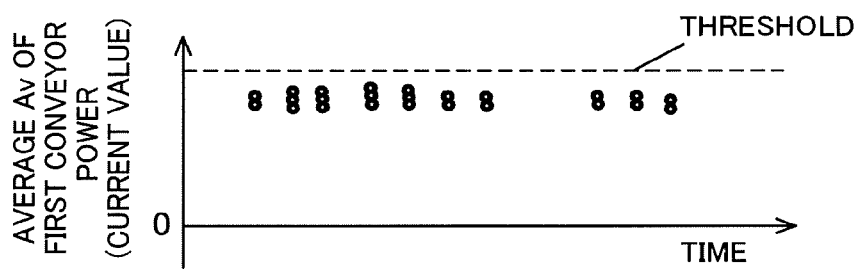
FIG. 31 is a graph concerning an average of the power of the first conveyor in the chip conveyor.
Figure 32:
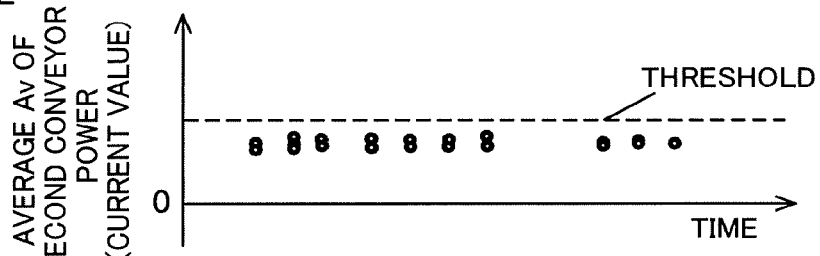
FIG. 32 is a graph concerning an average of power of a second conveyor in the chip conveyor.
Figure 33:
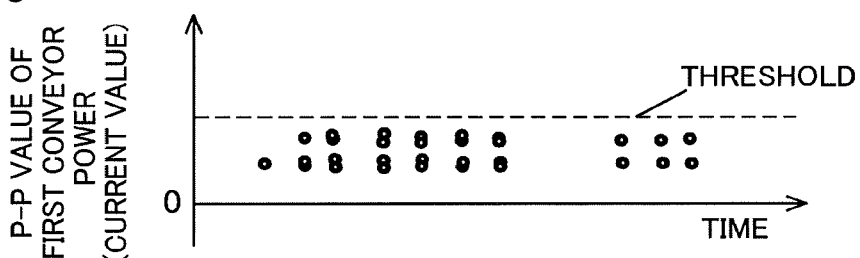
FIG. 33 is a graph concerning a peak-to-peak value of the power of the first conveyor in the chip conveyor.
Figure 34:
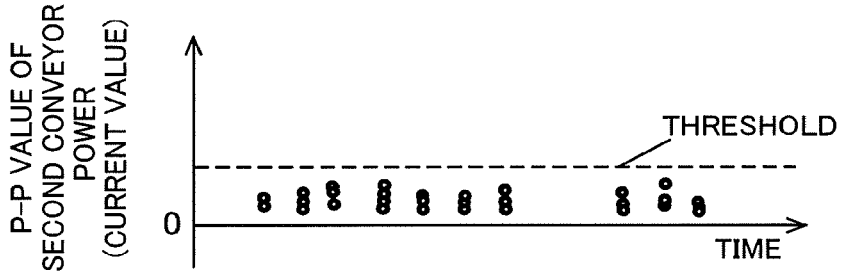
FIG. 34 is a graph concerning a peak-to-peak value of the power of the second conveyor in the chip conveyor.

As shown in FIG. 31, the threshold determining unit 191 determines a threshold using data of the average Av of the first driving device 121c, which is the statistical amount set as a threshold determination target. As shown in FIG. 32, the threshold determining unit 191 determines a threshold using data of the average Av of the second driving device 121d, which is the statistical amount set as a threshold determination target. As shown in FIG. 33, the threshold determining unit 191 determines a threshold using data of the peak-to-peak value P-P of the first driving device 121c, which is the statistical amount set as a threshold determination target. As shown in FIG. 34, the threshold determining unit 191 determines a threshold using data of the peak-to-peak value P-P of the second driving device 121d, which is the statistical amount set as a threshold determination target.

Concerning the average Av or the peak-to-peak value P-P of the first driving device 121c, the determining unit 192 determines abnormality of the first driving device 121c by comparing the threshold and the data of the statistical amount set as a determination target. Concerning the average Av or the peak-to-peak value P-P of the second driving device 121d, the determining unit 192 determines abnormality of the second driving device 121d by comparing the threshold and the data of the statistical amount set as a determination target.

For example, the determining unit 192 determines abnormality in which the first conveyor 121a comes off a guide because chips are excessively deposited on the first conveyor 121a and abnormality in which the first conveyor 121a fractures because chips are excessively deposited on the first conveyor 121a. The determining unit 192 determines abnormality in which the second conveyor 121b comes off a guide because chips are excessively deposited on the second conveyor 121b and abnormality in which the second conveyor 121b fractures because chips are excessively deposited on the second conveyor 121b.

The treatment unit 193 carries out treatment corresponding to a result of the determination of the determining unit 192. That is, a result of the determination of a state of the chip conveyor 121 of the production equipment 100 can be suitably used.

(5-3-5. Others)

Concerning the moving device 115, determination of abnormality can be performed in the same manner as the determination of abnormality concerning the other devices. Concerning the tool magazine device 119, the determination of abnormality can be performed in the same manner.

In the above explanation, the first data processing unit 160 and the second data processing unit 170 can be selectively used according to the relation between the target data and the statistical amount, the relation between the target data and the operation processing time, and the like. For example, the relation between the temperature of exhaust and the like and the outdoor air temperature is explained as the example of the first data processing unit 160 with reference to FIG. 18. When the relation is, for example, a relation corresponding to rotating speed, the second data processing unit 170 is used.

The analyzing device 141 can also be connected to the PLC 132, the CNC device 131, an external device, and the like by a network protocol such as the Ethernet (registered trademark) or a bus (a computer). The analyzing device 141 can acquire, as the target data, data concerning the production equipment 100, other production equipment peripheral devices such as a conveying device, and the like and ON/OFF states in the connected production equipment and various devices. These target data can be set as targets of the grouping. The data can be set as reference data serving as references for the grouping of data. For example, based on the ON/OFF states, the data from the ON state to the OFF state can be set as a grouping unit.

The plurality of first data processing units 160, the plurality of second data processing units 170, and the evaluating unit 190 of the analyzing device 141 can change a calculation state, a threshold, a determination state (hereinafter collectively referred to as various states) using a communication path of the Ethernet (registered trademark) or a bus (a computer). By changing the various states, data concerning the various states can be acquired for the production equipment 100, other production equipment peripheral devices such as a conveying device, and the like. States of the production equipment and the various devices can be determined based on statistical amounts corresponding to the various states and can be treated.

6. Fifth Embodiment (6-1. Configuration of the Production Equipment 1)

The production equipment 1 is a machine tool that sequentially machines a plurality of types of production target objects W (hereinafter referred to as "workpieces W") based on a production schedule. That is, the production equipment 1 is a machine for performing production of a variety of products in small amounts. The production equipment 1 performs, for example, cutting, grinding, forging, and electric discharge machining using tools. An example of the product equipment 1 is substantially the same as the production equipment 1 in the first embodiment as shown in FIGS. 1 and 2. Differences from the production equipment 1 in the first embodiment are explained.

Figure 2:
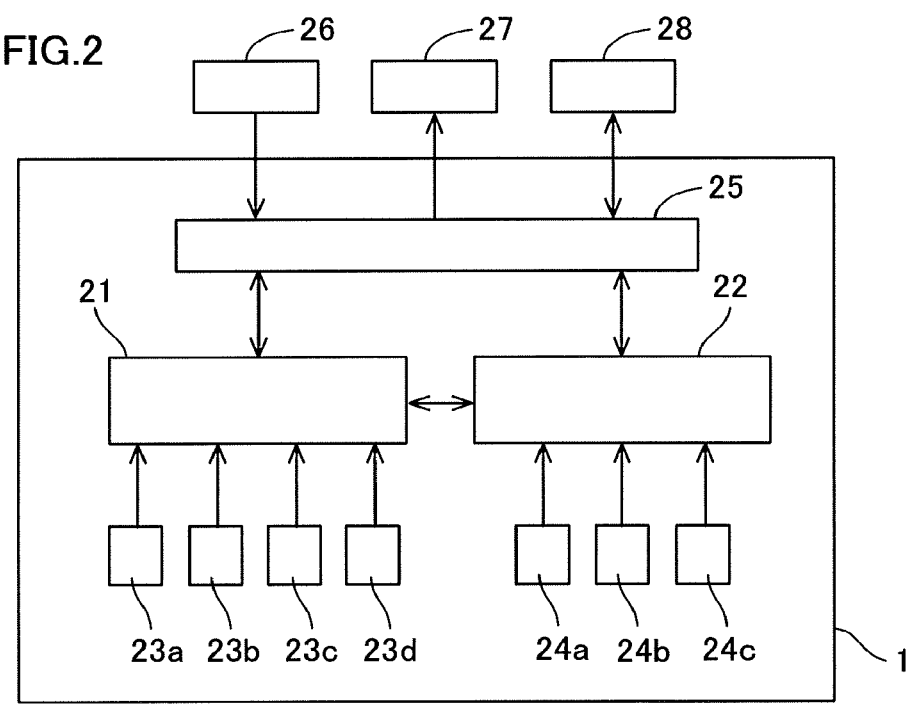
FIG. 2 is a diagram showing a functional block concerning the production equipment.

The production equipment 1 includes, as shown in FIG. 2, the CNC device 21, the PLC 22, the various detectors 23a, 23b, 23c, 23d, 24a, 24b, and 24c, and the data processing device 25 functioning as a first predicting device (hereinafter referred to as "first predicting device 25").

The first predicting device 25 (a tool-life predicting device) predicts the life of each of the plurality of types of tools 15 when a plurality of types of workpieces W are machined using the plurality of types of tools 15. The first predicting device 25 acquires detection data of the detectors 23a to 23d and 24a to 24c provided in the production equipment 1 (equivalent to the data concerning the production equipment 1), control data in the CNC device 21, I/O data stored in the I/O memory in the PLC 22, and the like.

Further, when a LAN cable connected to a LAN connector is connected to the managing device 28 (a tool-life predicting device) such as a server, the first predicting device 25 can transmit data of a processing result or the like by the first predicting device 25 to the managing device 28 functioning as a second predicting device. The managing device 28 functioning as the second predicting device stores a production schedule and predicts the life of a tool using the processing result by the first predicting device 25, the production schedule, and a machining program. That is, the managing device 28 functioning as the second predicting device predicts, considering the production schedule, the life of each of the plurality of types of tools 15 when the plurality of types of workpieces W are machined using the plurality of types of tools 15.

Note that the first predicting device 25 is explained as a device separate from the CNC device 21 and the PLC 22. However, the first predicting device 25 can be a system incorporating the CNC device 21, the PLC 22, and the like and can be a personal computer, a server, or the like disposed in a position separate from the production equipment 1. The first predicting device 25 and the managing device 28 configure a tool-life predicting device 250.

(6-2. Configuration of the Tool-Life Predicting Device 250)

Figure 35:
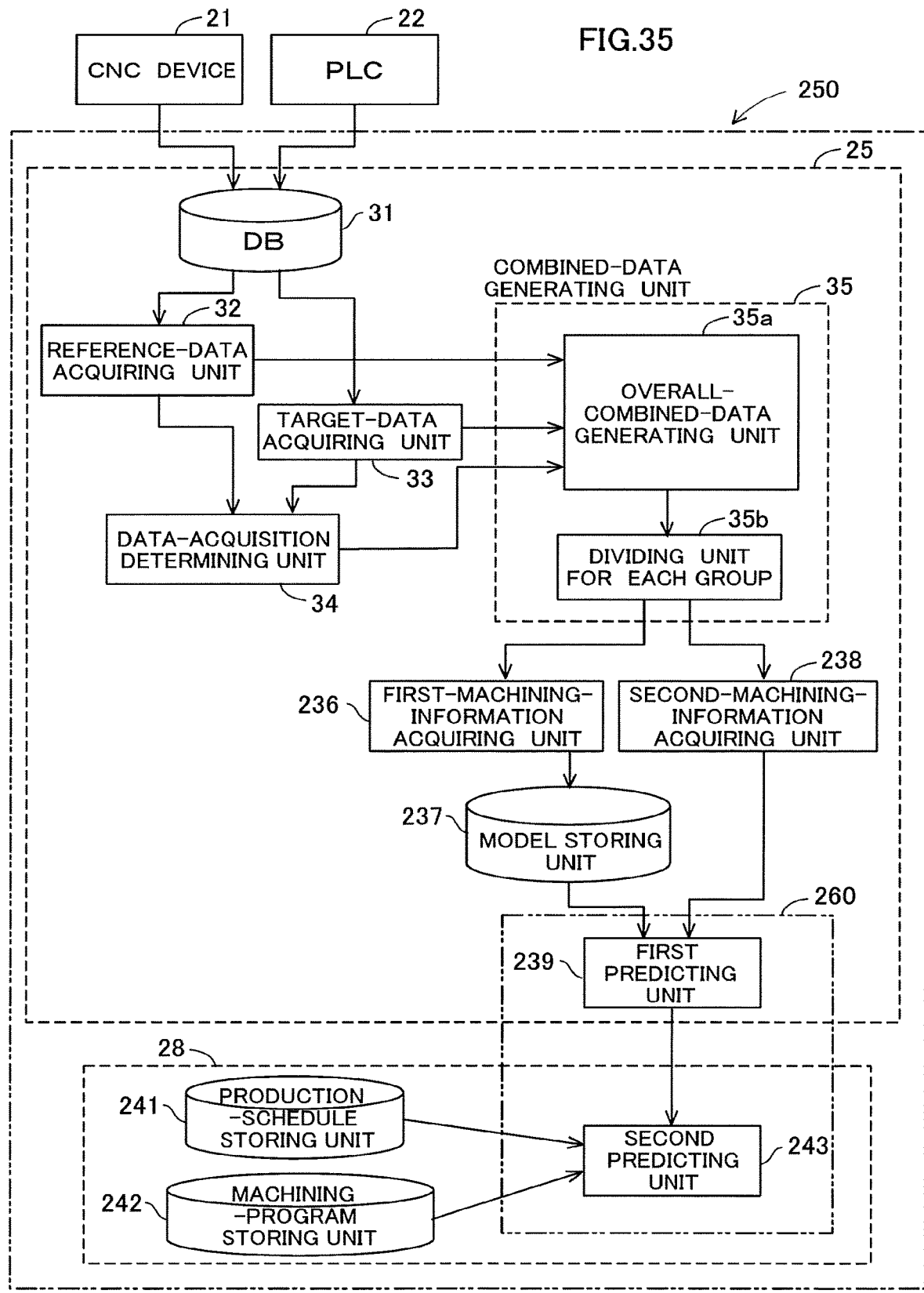
FIG. 35 is a functional block diagram of a tool life predicting device.

The configuration of the tool-life predicting device 250 is explained with reference to FIGS. 35 to 42. As shown in FIG. 35, the tool-life predicting device 250 is configured by the first predicting device 25 and the managing device 28 functioning as the second predicting device.

The first predicting device 25 includes the first database 31, the reference-data acquiring unit 32, the target-data acquiring unit 33, the data-acquisition determining unit 34, the combined-data generating unit 35, a first-machining-information acquiring unit 236, a model storing unit 237, a second-machining-information acquiring unit 238, and a first predicting unit 239. The first database 31, the reference-data acquiring unit 32, the target-data acquiring unit 33, the data-acquisition determining unit 34, and the combined-data generating unit are substantially the same as the components in the first embodiment.

However, the combined-data generating unit 35 includes the overall-combined-data generating unit 35a and a dividing unit for each tool 35b. The dividing unit for each tool 35b is substantially the same as the dividing unit for each group 35b in the first embodiment. That is, the dividing unit for each tool 35b divides, for each tool, the overall combined data (File_C) based on the groups (Gr1, Gr2, and Gr3) of the reference data (File_A) in the overall combined data (File_C) to thereby generate combined data for each tool (File_D_Gr1, File_D_Gr2, and File_D_Gr3) for each type of the tool 15 as shown in FIGS. 7A to 7C.

When first machining concerning the plurality of types of workpieces W is performed using a first tool for information acquisition corresponding to each of the plurality of types of tools 15, the first-machining-information acquiring unit 236 acquires first machining information from a start of use to exhaustion of life of the first tool. The first machining information is the combined data for each tool (File_D_Gr1, File_D_Gr2, and File_D_Gr3) generated by the dividing unit for each tool 35b when the first machining is performed.

The first machining is, for example, machining for the plurality of types of workpieces W executed based on an actual production schedule for performing production of a variety of products in small amounts. However, the first machining is not limited to the machining based on the actual production schedule and can be trial machining.

Figure 36:
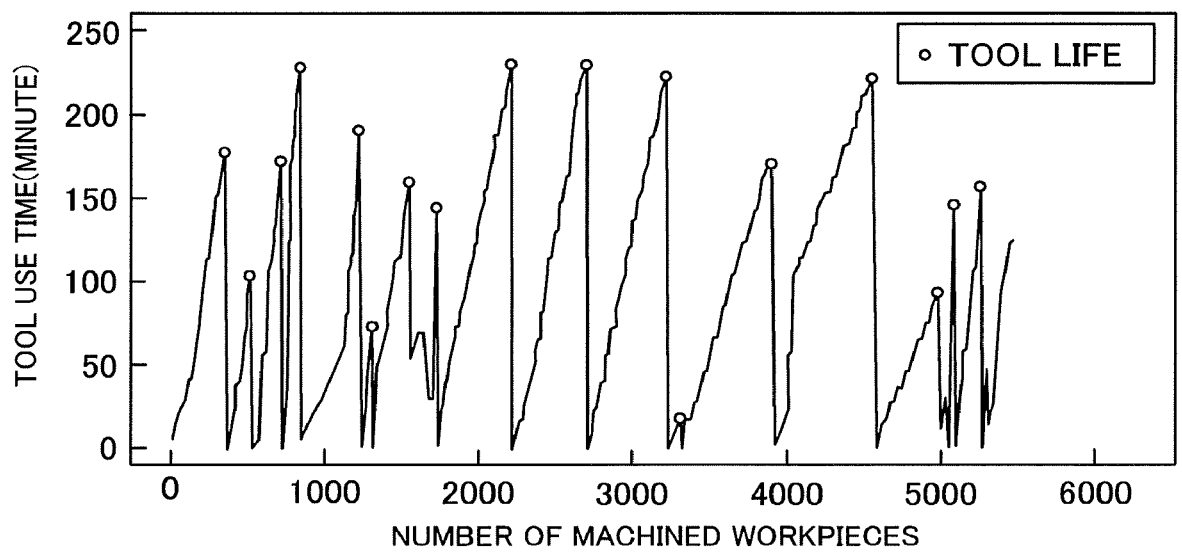
FIG. 36 is a diagram showing a relation between the number of machined workpieces and a use time of a tool in the case of machining of a plurality of types of workpieces.

When the plurality of types of workpieces W are machined by the plurality of types of tools 15, each of the tools 15 is replaced with a new product every time the tool 15 exhausts life. For example, when the first machining is performed focusing on the tool 15 of the tool number T1, a relation between the number of machined workpieces W and a use time of the tool 15 is shown in FIG. 36. In FIG. 36, when the tool 15 is replaced with a new product, the use time of the tool 15 is reset. That is, in FIG. 36, circles indicate timings when the tool 15 is determined by an operator as having exhausted life and the tool 15 is replaced with a new product.

As shown in FIG. 36, when a type of the workpieces W is different, the number of machined workpieces W and the use time of the tool 15 from a start of use to exhaustion of life of the tool 15 are different. For example, when the use time of the tool 15 that has exhausted life is various times such as 200 minutes or more and approximately 50 minutes. The number of workpieces W machined until the exhaustion of life is also various.

Figure 37:
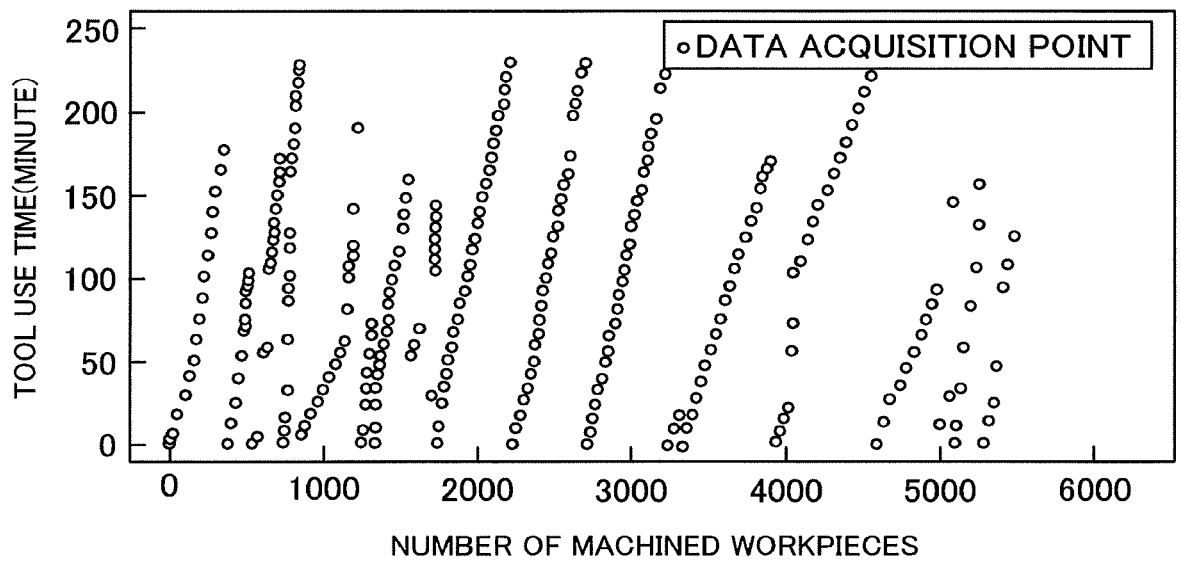
FIG. 37 shows acquisition timings of first machining information in the same figure as FIG. 36.

The first-machining-information acquiring unit 236 acquires first machining information when the first machining is performed. Timings when the first-machining-information acquiring unit 236 acquires the first machining information are indicated by, for example, circles in FIG. 37. Like FIG. 36, FIG. 37 is a diagram showing a relation between the number of machined workpieces W and the use time of the tool 15. The first machining information to be acquired is the combined data for each tool (File_D_Gr1, File_D_Gr2, and File_D_Gr3) generated by the dividing unit for each tool 35b. That is, the first machining information is information grouped for each type of the tool 15. The first machining information includes information concerning a use time of the tool 15, feature values of torque of the motor of the spindle device 14, feature values of torque of the motors in the X, Y, and Z axes, feature values concerning vibration of the spindle device 14, machining conditions, the material of the workpiece W, and the like. In this way, the first machining information includes a plurality of types of variables.

The model storing unit 237 stores an arithmetic model determined based on the first machining information concerning the plurality of types of workpieces W, that is, an arithmetic model for performing life prediction for a tool of the same type as the first tool. The arithmetic model is a model capable of predicting presence or absence of exhaustion of life of the tool 15 and the remaining use time until the exhaustion of life of the tool 15.

Figure 38:
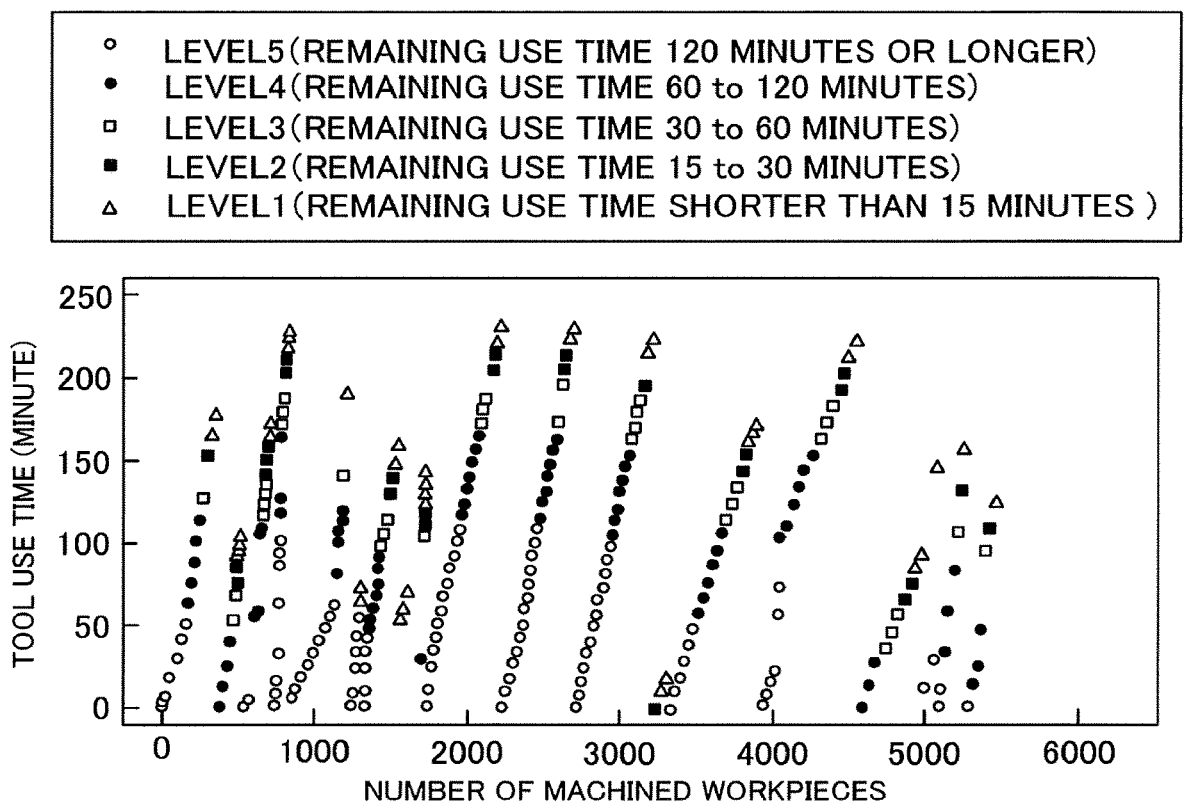
FIG. 38 is a diagram showing a level corresponding to a remaining use time predicted by an arithmetic model concerning each of the acquisition timings of the first machining information in the same figure as FIG. 36.

For example, the arithmetic model may predict the remaining use time itself until the exhaustion of life or may determine a pertinent level out of a plurality of levels corresponding to the predicted remaining use time. In this embodiment, the arithmetic model determines the latter level. As shown in FIG. 38, the plurality of levels are classified into, for example, levels 1 to 5. The level 1 corresponds to the predicted remaining use time shorter than 15 minutes. The level 2 corresponds to the predicted remaining use time equal to or longer than 15 minutes and shorter than 30 minutes. The level 3 corresponds to the predicted remaining use time equal to or longer than 30 minutes and shorter than 60 minutes. The lever 4 corresponds to the predicted remaining use time equal to or longer than 60 minutes and shorter than 120 minutes. The level 5 corresponds to the predicted remaining use time equal to or longer than 120 minutes. That is, the level 1 is a state close to exhaustion of life and the level 5 is a state close to a new product.

The arithmetic model predicts, based on the first machining information, a level corresponding to the remaining use time. An actual remaining use time of the tool 15 and the remaining use time predicted based on the first machining information are set to match. The level corresponding to the remaining use time predicted using the set arithmetic model and the first machining information is as shown in FIG. 38. As shown in FIG. 38, it is seen that, at timing when the tool 15 has just been replaced with a new product, the level is the level 5 and, near the exhaustion of life, the level is the level 1.

As the arithmetic model, linear adaptation (e.g., linear adaptation control), nonlinear identification (e.g., sequential identification), a Beyes' method (e.g., a naive Beyes classifier or a Beyesian network), machine learning (e.g., a neural network, a support vector machine (SVM), a random forest, or a k nearest neighbor method), a regression analysis (e.g., a multiple regression analysis, ridge regression, or logistic regression), and the like can be applied.

Figure 39:
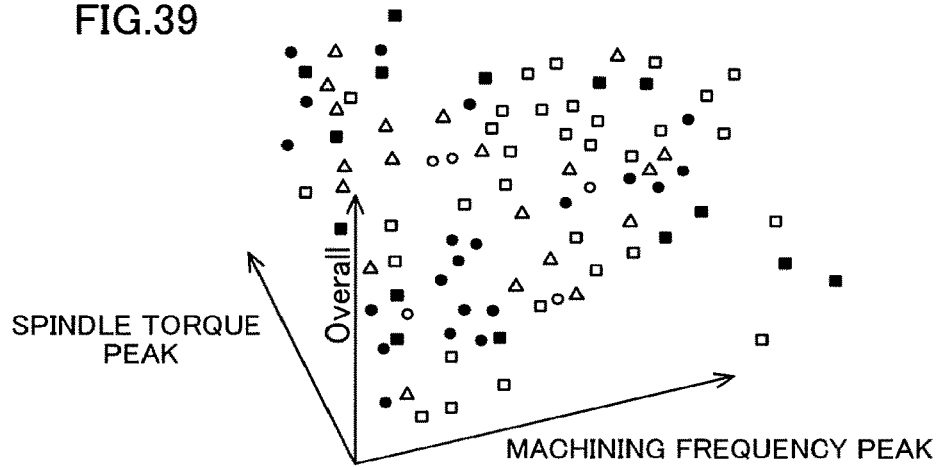
FIG. 39 is a diagram showing a three-dimensional space in which a machining frequency peak, a spindle torque peak, and an overall value are set as variables as an example of variables of the arithmetic operation mode.

For example, as shown in FIG. 39, the arithmetic model includes a machining frequency peak, a spindle torque peak, and an overall value as variables and determines a level based on values of these three variables. Note that the arithmetic model can be a model including four or more variables and can be a model including one or two variables. The model storing unit 237 may store a plurality of types of arithmetic models. For example, the model storing unit 237 may store an arithmetic model of the machine learning and an arithmetic model of the regression analysis. The model storing unit 237 may store a different arithmetic model according to, for example, a type of a machining material and machining conditions.

The arithmetic model performs life prediction for the tool 15 at any time using values of the variables at the any time. That is, to perform life prediction for the tool at specific time, the arithmetic model only uses information at the time (instance) without using information in the past. Note that the arithmetic model may perform the life prediction for the tool 15 using the information in the past.

After once storing a determined arithmetic model, the model storing unit 237 may update the arithmetic model using continuously acquired first machining information. Naturally, after once storing the determined arithmetic model, the model storing unit 237 may not update the arithmetic model. When the arithmetic model is updated, the first-machining-information acquiring unit 236 continues to acquire the combined data for each tool (File_D_Gr1, File_D_Gr2, and File_D_Gr3) as the first machining information. On the other hand, when the arithmetic model is not updated, after the arithmetic model is determined, the first-machining-information acquiring unit 236 does not acquire the combined data for each tool (File_D_Gr1, File_D_Gr2, and File_D_Gr3) serving as the first machining information.

After the arithmetic model is stored in the model storing unit 237, when second machining concerning the plurality of types of workpieces W is performed using a second tool, which is the tool 15 of the same type as the first tool and is a life prediction target, the second-machining-information acquiring unit 238 acquires second machining information at the time when the second machining is performed. The second machining information is the combined data for each tool (File_D_Gr1, File_D_Gr2, and File_D_Gr3) generated by the dividing unit for each tool 35*b* when the second machining is performed.

The second machining is machining for the plurality of types of workpieces W executed following the first machining. Besides, when the arithmetic model is updated after the arithmetic model is once stored in the model storing unit 237, the first machining and the second machining are the same. That is, in the latter case, the combined data for each tool (File_D_Gr1, File_D_Gr2, and File_D_Gr3) generated by the dividing unit for each tool 35*b* is the first machining information and is the second machining information. That is, as indicated by circles in FIG. 37, the second-machining-information acquiring unit 238 acquires the combined data for each tool (File_D_Gr1, File_D_Gr2, and File_D_Gr3) serving as the second machining information. Note that, like the first machining information, the second machining information is the combined data for each tool (File_D_Gr1, File_D_Gr2, and File_D_Gr3). Therefore, the second machining information includes a plurality of types of variables.

The first predicting unit 239 performs life prediction for the second tool based on the second machining information and the arithmetic model. In particular, the first predicting unit 239 performs the life prediction for the second tool at any time based on the second machining information and the arithmetic model at only the any time.

The first predicting unit 239 outputs information concerning life prediction corresponding to an output form of the arithmetic model. For example, when the arithmetic model is a model for calculating presence or absence of exhaustion of life of the tool 15, the first predicting unit 239 calculates presence or absence of exhaustion of life of the second tool. When the arithmetic model is a model for calculating the remaining use time until the exhaustion of life of the tool 15, the first predicting unit 239 calculates a use time until the exhaustion of life of the second tool. When the arithmetic model determines a level corresponding to the remaining use time of the tool 15, the first predicting unit 239 determines a level of the second tool. In this embodiment, an example is explained in which the first predicting unit 239 determines the level of the second tool based on the second machining information using an arithmetic model for determining the levels 1 to 5.

For example, it is assumed that the arithmetic model is a model that includes a machining frequency peak, a spindle torque peak, and an overall value as variables as shown in FIG. 39 and determines a level based on variables of these three variables. In this case, as shown in FIG. 39, points corresponding to the first machining information are plotted in this three-dimensional space. Attributes of levels are included in the plot points.

Figure 40:
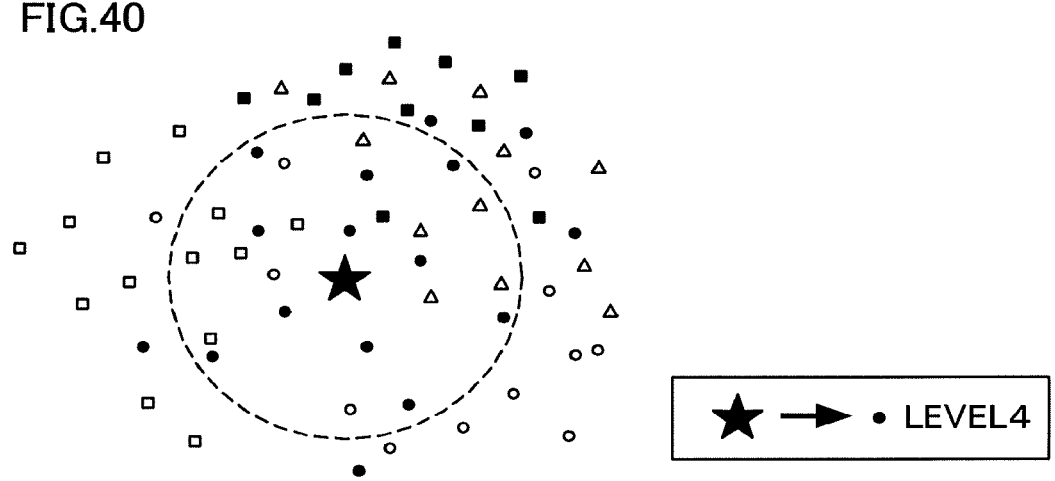
FIG. 40 is a diagram showing a two-dimensional space for explaining a k nearest neighbor method as an example of the arithmetic model.

The arithmetic model applies the k nearest neighbor method as an example. In the k nearest neighbor method, a level into which a largest number of data are classified is allocated out of a group of k data located nearest (a data group corresponding to the first machining information) in a three-dimensional space formed by, for example, three variables. Here, k is a set number. To facilitate understanding, a two-dimensional space shown in FIG. 40 is referred to. As shown in FIG. 40, in the two-dimensional space, when points corresponding to the second machining information at any time are star marks, black circles are present by a largest number among a group of k (e.g., twenty-five) data corresponding to the first machining information near the star marks. Therefore, the points (the star marks) corresponding to the second machining information at the any time are classified into the black circles, that is, the level 4. That is, a level of the second tool at the any time is determined as the level 4, that is, a level of the remaining use time of 60 to 120 minutes until the exhaustion of life.

In the above explanation, the first predicting unit 239 determines levels of the second tool at respective times using only one type of an arithmetic model. When a plurality of types of arithmetic models are stored in the model storing unit 237, the first predicting unit 239 may determine a level of the second tool using one type of an arithmetic model selected out of the plurality of types of arithmetic models. In this case, the arithmetic model may be selected according to, for example, the material of the workpiece W, machining conditions, and the like.

When the plurality of types of arithmetic models are stored in the model storing unit 237, the first predicting unit 239 may determine each level of the second tool using each of the plurality of types of arithmetic models. In this case, because a plurality of levels are obtained, a level most often obtained among the obtained plurality of levels can be set as a level of the second tool. In this case, all of the plurality of types of arithmetic models stored in the model storing unit 237 may be used or a plurality of types of arithmetic models selected out of the stored plurality of types of arithmetic models may be used.

As explained above, the first predicting unit 239 determines the levels of the second tool at the respective times (respective instances). The first predicting unit 239 can also determine presence or absence of exhaustion of life of the second tool based on behaviors of the levels of the second tool. This is explained with reference to FIG. 41.

Figure 41:
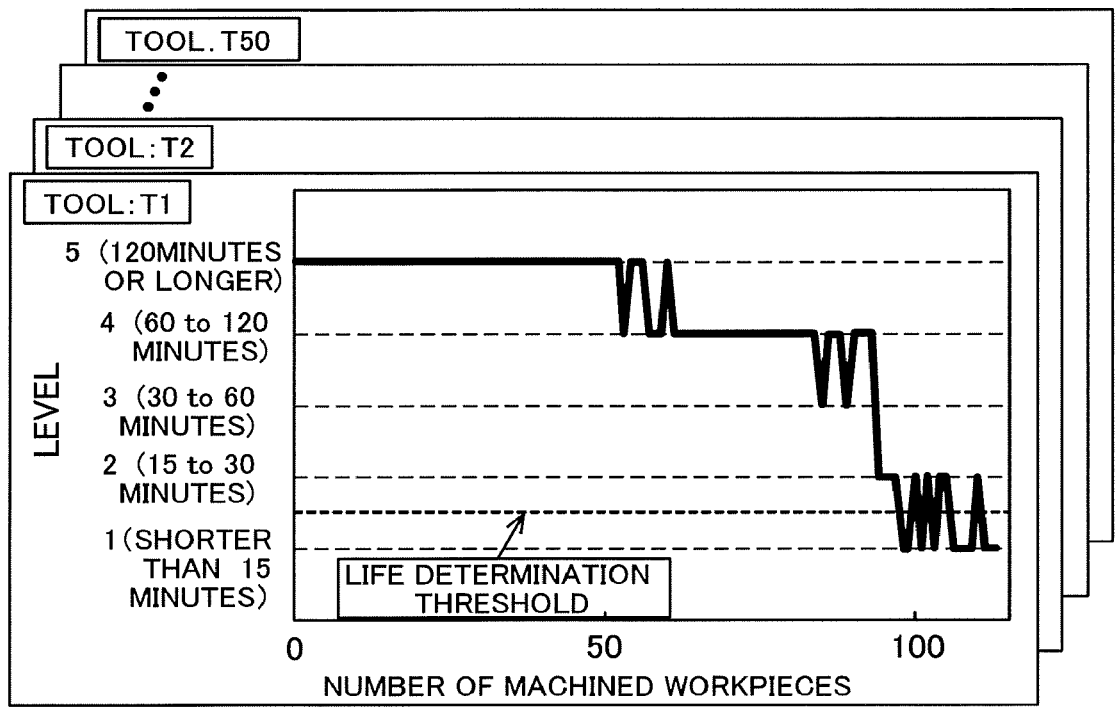
FIG. 41 is a diagram showing, concerning tools, behaviors of levels corresponding to the number of machined workpieces.

In FIG. 41, behaviors of levels corresponding to the number of machined workpieces W are shown concerning the tools 15 of tool numbers T1 to T50. Time when the number of machined workpieces W is 0 is time of a start of use of the tool 15. For example, according to a behavior of a level of the tool 15 of the tool number T1, the level of the tool 15 of the tool number T1 is the level 5 when the number of machined workpieces W (hereinafter referred to as "number of machined workpieces") from the start of use of the tool 15 of the tool number T1 is 0 to approximately 50. Thereafter, the level of the tool 15 of the tool number T1 is between the level 5 and the level 4 when the number of machined workpieces is approximately 50 to approximately 60. Thereafter, the level of the tool 15 of the tool number T1 is the level 4 when the number of machined workpieces is approximately 60 to approximately 80.

Thereafter, the level of the tool 15 of the tool number T1 is between the level 4 and the level 3 when the number of machined workpieces is approximately 80 to 90. Thereafter, the level of the tool 15 of the tool number T1 changes from the level 4 to the level 2 all at once when the number of machined workpieces is approximately 95. Thereafter, the level of the tool 15 of the tool number T1 is between the level 2 and the level 1 when the number of machined workpieces is approximately 95 to 120.

For example, it is assumed that the tool 15 of the tool number T1 exhausts life when a predetermined period elapses after the level of the tool 15 of the tool number T1 changes to the level 1. However, as shown in FIG. 41, even if the level changes to the level 1, the level sometimes returns to the level 2. Therefore, the first predicting unit 239 predicts exhaustion of life of the second tool based on the number of times or a frequency a determined level is assumed to be a level (the level 1) for minimizing the remaining use time. For example, the first predicting unit 239 predicts that the second tool exhausts life when the number of times of the level 1 reaches ten times. The first predicting unit 239 may predict that the second tool exhausts life when the number of times of the level 1 in a predetermined number of times of machining (e.g., ten times) reaches five times. Besides being based on the number of times and the frequency, the first predicting unit 239 may predict that the second tool exhausts life when the tool 15 reaches the predetermined number of times of machining after the tool 15 reaches the level 1 for the first time.

The first predicting unit 239 executes processing for notifying and displaying, to and on a control panel (not shown in FIG. 35) of the production equipment 1 and a portable terminal or the like carried by the operator, information concerning the tool 15 that has exhausted life or the tool 15 that will exhaust life soon. The first predicting unit 239 can also execute processing for displaying, on the control panel and the portable terminal or the like, present levels of the tools 15 of the tool numbers T1 to T50. Further, the first predicting unit 239 can also execute processing for displaying behaviors of levels to the present shown in FIG. 41 other than the present levels. Therefore, the operator can grasp behaviors until the tool 15 exhausts life, for example, which tool 15 has exhausted life or whether the tool 15 about to exhaust life is present. Therefore, the operator can prepare the tool 15 that should be replaced.

The tool-life predicting device 250 includes the managing device 28 functioning as the second predicting device in addition to the first predicting device 25. As explained above, the managing device 28 is connected to the first predicting device 25 by the LAN cable or the like. The managing device 28 is configured by a production-schedule storing unit 241, a machining-program storing unit 242, and a second predicting unit 243.

The production-schedule storing unit 241 stores a production schedule of the plurality of types of workpieces W to be machined by the production equipment 1 functioning as the machine tool. The production schedule includes information concerning machining order of the plurality of types of workpieces W, times when machining of the workpieces W is started, and the like. In the machining-program storing unit 242, a machining program corresponding to the workpieces W to be machined is stored. Although not shown in FIG. 35, the production equipment 1 machines the workpieces W according to the production schedule. When machining the workpieces W, the production equipment 1 uses the machining program stored in the machining-program storing unit 242. However, a control device (not shown in FIG. 35) of the production equipment 1 may acquire the production schedule and the machining program from the managing device 28 and store the production schedule and the machining program in advance.

The second predicting unit 243 acquires the remaining use times until exhaustion of life of the tools 15 functioning as the second tool predicted by the first predicting unit 239. Further, the second predicting unit 243 predicts timings of the exhaustion of life of the tools 15 using the acquired remaining use times of the tools 15, the production schedule, and the machining program. The prediction of the timings of the exhaustion of life by the second predicting unit 243 is explained with reference to FIG. 42.

Figure 42:
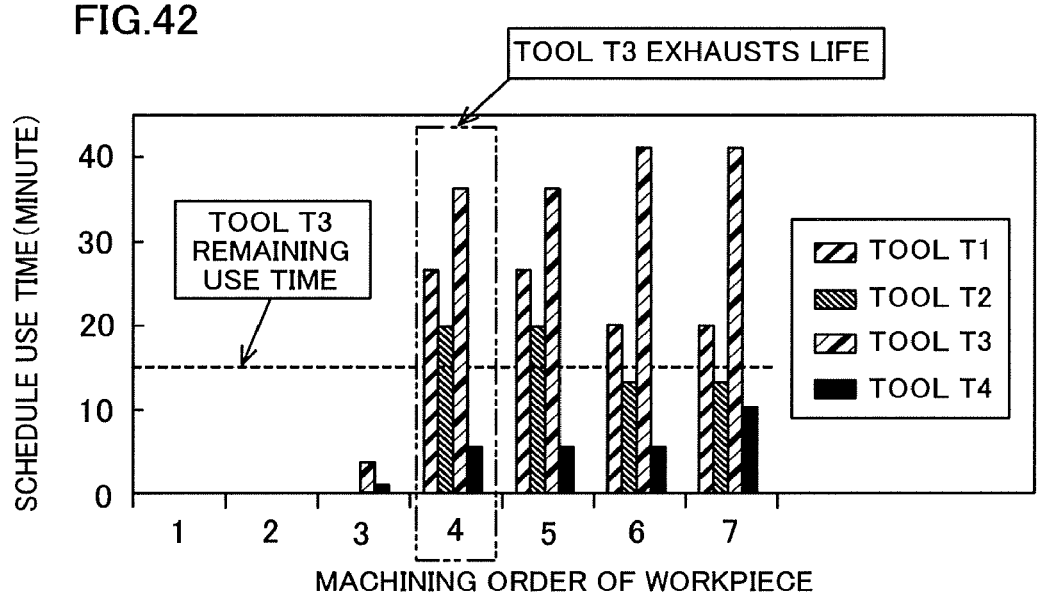
FIG. 42 is a diagram for explaining prediction of timing of exhaustion of life by a second predicting unit.

In FIG. 42, machining order of the workpieces W based on the production schedule is plotted on the horizontal axis and scheduled use times of the tools 15 of the tool numbers T1 to T4 in machining the workpieces W with the tools 15 of the tool numbers T1 to T4 are plotted on the vertical axis. The second predicting unit 243 grasps the machining order of the workpiece W according to the production schedule stored in the production-schedule storing unit 241. By analyzing the machining program stored in the machining-program storing unit 242, the second predicting unit 243 can predict times in which the tools 15 are used in the machining program. Specifically, the second predicting unit 243 can predict, based on distances of machining routes by the tools 15 and moving speeds of the tools 15 during the machining, the times in which the tools 15 are used. In the following explanation, the times in which the tools 15 are used are referred to as scheduled use times.

It is assumed by the first predicting unit 239 that the remaining use time until exhaustion of life of the tool 15 of the tool number T3 is 15 minutes. The tools 15 of the tool numbers T1 to T4 are not used for first and second workpieces W. The tools 15 of the tool numbers T1 and T2 are not used and the tools 15 of the tool numbers T3 and T4 are used for a third workpiece W. Scheduled use times of the tools 15 of the tool numbers T3 and T4 at this time are three minutes and one minute in order. The tools 15 of the tool numbers T1 to T4 are used for a fourth workpiece W. Scheduled use times of the tools 15 of the tool numbers T1 to T4 are 27 minutes, 20 minutes, 37 minutes, and four minutes in order. All the tools 15 of the tool numbers T1 to T4 are used for fifth to seventh workpieces W.

When focusing on the tool 15 of the tool number T3, a cumulative total of scheduled use times of the tool 15 of the tool number T3 in machining the first to third workpieces W is three minutes. A cumulative total of scheduled use times of the tool 15 of the tool number T3 in machining the first to fourth workpieces W is 39 minutes. Because the remaining use time of the tool 15 of the tool number T3 is 15 minutes, the second predicting unit 243 predicts that the tool 15 of the tool number T3 exhausts life halfway in machining the fourth workpiece W.

However, because only the use time of the tool 15 is used in the prediction by the second predicting unit 243 explained above, the material of the workpiece W, machining conditions, and the like are not considered. The prediction is inaccurate. Therefore, the second predicting unit 243 may correct the scheduled use time according to the material of the workpiece W, the machining conditions, and the like.

The second predicting unit 243 transmits, to the control panel of the production equipment 1 and the portable terminal or the like carried by the operator, information concerning timings of exhaustion of life of the tools 15, that is, information concerning which workpieces W the tools 15 are machining when the tools 15 exhaust life. The control panel and the portable terminal can display the information. Therefore, the operator can prepare the tool 15 that should be replaced.

Note that the first predicting unit 239 and the second predicting unit 243 are equivalent to the predicting unit 60 in the present invention. In the above explanation, the first predicting unit 239 and the second predicting unit 243 are the separate devices but can be an integral device. That is, the second predicting unit 243 may be provided in the production equipment 1. Not only the second predicting unit 243 but also the production-schedule storing unit 241, the machining-program storing unit 242, and the second predicting unit 243 explained as the managing device 28 may be provided in the production equipment 1. Like the first predicting unit 239, the second predicting unit 243 can be a system incorporating the CNC device 21, the PLC 22, and the like and can also be a personal computer, a server, or the like disposed in a position separate from the production equipment 1.

(6-3. Effects)

The arithmetic model stored in the model storing unit 237 is determined based on the first machining information from the start of use until the exhaustion of life of the first tool when the first machining of the plurality of types of workpieces W is performed by the first tool. That is, the arithmetic model considers states of the first tool from the start of use until the exhaustion of life of the first tool. Further, the first machining information for determining the arithmetic model is information obtained when the plurality of types of workpieces W are machined by the first tool. Therefore, the arithmetic model is not for machining of a specific one type of a workpiece W and is for machining of the plurality of types of workpieces W. That is, the arithmetic model is for production of a variety of products in small amounts.

The first predicting unit 239 performs the life prediction concerning the second tool by using the arithmetic model and using the second machining information obtained when the second machining is performed by the second tool of the same type as the first tool. That is, the first predicting unit 239 can learn in which state from a start of use to exhaustion of life the second tool is present and can perform life prediction for the second tool by using the second machining information by the second tool and the arithmetic model.

Accordingly, it is possible to perform life prediction for the tool 15 in production of a variety of products in small amounts. It is possible to highly accurately perform the life prediction for the tool 15 by considering states of the tool 15 from the start of use until the exhaustion of life of the tool 15.

Note that, in FIG. 38, the first machining information used to determine the arithmetic model is acquired for the sixteen tools 15. However, the first machining information only has to be acquired for two or more tools 15. However, accuracy of the arithmetic model is higher as the number of samplings is larger. Therefore, it is more desirable that the number of tools 15 for which the first machining information is acquired is larger.

As the life prediction, the first predicting unit 239 may predict any of the presence or absence of exhaustion of life, the remaining use time until the exhaustion of life, and the level. The first predicting unit 239 desirably determine a target of prediction according to a purpose.

The first predicting unit 239 performs the life prediction for the tool 15 at any time using the second machining information at only the any time. That is, the first predicting unit 239 does not use information in the past in the life prediction. That is, the arithmetic model is a model that can perform the life prediction using only information at the instance. Consequently, it is possible to simplify the arithmetic model and reduce a processing time required for the life prediction. Therefore, it is possible to perform the life prediction on a real-time basis.

Use of a plurality of types of variables can realize more highly accurate life prediction. However, if the life prediction is preformed using the plurality of types of variables while using information in the past, the arithmetic model is complicated and the processing time required for the life prediction increases. Then, the life prediction cannot be performed on a real-time basis. However, although the first predicting unit 239 uses the plurality of types of variables, the first predicting unit 239 performs the life prediction using the second machining information at only any time. Therefore, it is possible to perform real-time and highly accurate life prediction.

The first predicting unit 239 may use one type of an arithmetic model or may use a plurality of types of arithmetic models. By preparing the plurality of types of arithmetic models, an arithmetic model to be applied can also be selected, for example, according to the material of the workpiece W. As a result, it is possible to perform highly accurate life prediction. It is also possible to comprehensively determine final life prediction based on a plurality of life predictions performed using the plurality of types of arithmetic models. This also makes it possible to perform highly accurate life prediction.

The second predicting unit 243 predicts the timing of the exhaustion of life of the tool 15 using the production schedule and the machining program. Consequently, it is possible to predict to which workpiece W following the workpiece W currently being machined can be machined using the present tool 15. Therefore, it is possible to use the tool 15 to the last moment of the exhaustion of life.

The first machining information and the second machining information are the combined data for each tool (File_D_Gr1, File_D_Gr2, and File_D_Gr3) for each type of the tool 15. Usually, it is not easy to collect various kinds of information for each type of the tool 15. However, the combined-data generating unit 35 generates the combined data for each tool using, as the reference for grouping, the reference data including the identification information of the tool 15 and the operation time information of the tool 15. Therefore, information associated with a lot of information for each type of the tool 15 can be surely obtained as the first machining information and the second machining information. Consequently, the arithmetic model can be easily set to a variety of models. It is possible to easily determine an arithmetic model that can perform highly accurate life prediction.

RFIDs (RF tags) may be attached to the tools 15 and the workpieces W (including boxes for conveyance) to distinguish types of the tools 15 and the workpieces W and reflect the types on prediction.

What is claimed is:

1. A data processing device of production equipment, comprising:
    a processor configured to:
    acquire target data representing a state of the production equipment detected by a detector provided in the production equipment, the target data including a first data type which is classified into a plurality of groups and a second data type which is not classified into a plurality of groups;
    acquire, in the production equipment, reference data including a reference for grouping the target data and a time in which the reference for grouping the target data operates in a case where the target data falls under the first data type;
    generate, for each group of the reference data, combined data for each group obtained by combining, with the reference data, data detected in a same period of time as an operation period of time of the reference data in the target data in the case where the target data falls under the first data type;
    calculate, using a statistical method, a statistical amount of the target data in a case where the target data falls under the second data type;
    calculate, using a statistical method, a statistical amount of the combined data for each group in the case where the target data falls under the first data type;
    determine a state of the production equipment based on the statistical amount of the target data in the case where the target data falls under the second data type;
    determine the state of the production equipment based on the statistical amount of the combined data for each group in the case where the target data falls under the first data type; and
    carry out a treatment corresponding to the state of the production equipment, wherein
    the target data evaluates an abnormality of at least one object device selected from a driving device for driving rotation of a rotating body, a driving device for moving a moving body, a clamp device of an automatic tool exchange device, a shutter opening/closing device of the automatic tool exchange device, a clamp device of an automatic pallet exchange device, a driving device for a chip conveyor, and a driving device for a tool magazine device, and
    the state of the production equipment includes the abnormality of the at least one object device.

2. The data processing device of the production equipment according to claim 1, wherein the processor is configured to:
    calculate, based on the target data, an operation processing time from an operation start time to an operation completion time by one of the driving devices, and
    determine a state of the one of the driving devices based on the operation processing time.

3. The data processing device of the production equipment according to claim 1, wherein
    the detector detects vibration data in the driving device for driving the rotation of the rotating body as the target data representing a state of the driving device for driving the rotation of the rotating body, and
    the processor is configured to:
    calculate the statistical amount by applying any processing of a frequency analysis, calculation of a root-mean-square, calculation of a standard deviation, and calculation of an average as the statistical method to the vibration data, and
    determine the state of the driving device for driving the rotation of the rotating body by comparing a threshold and the calculated statistical amount.

4. The data processing device of the production equipment according to claim 1, wherein
    the production equipment further includes a rotational structure for supplying lubricant to a bearing,
    the detector detects, as the target data representing a state of one of the driving devices, a temperature of the lubricant discharged from the bearing or a temperature of exhaust in a pipe of the lubricant discharged from the bearing and an outdoor air temperature around the one of the driving devices, and
    the processor is configured to:
    calculate, as the statistical amount, a relation between the temperature of the lubricant discharged from the bearing or the temperature of the exhaust in the pipe of the lubricant and the outdoor air temperature, and
    determine the state of the one of the driving devices by comparing a threshold and the statistical amount.

5. The data processing device of the production equipment according to claim 2, wherein
    the one of the driving devices is the driving device for driving the rotation of the rotating body and is configured to perform rotation driving at a rotating speed corresponding to a command, and the processor is configured to:

calculate the operation processing time from a start time of a change of the rotating speed until a time when the driving device for driving the rotation of the rotating body reaches the rotating speed of the command, and determine a state of the driving device for driving the rotation of the rotating body by comparing the operation processing time and a threshold.

6. The data processing device of the production equipment according to claim 1, wherein the automatic tool exchange device is configured to replace a tool for machining a production target object or the automatic pallet exchange device is configured to replace a pallet on which the production target object is placed, the detector detects power of a driving device in the automatic tool exchange device or the automatic pallet exchange device, and the processor is configured to:

calculate a maximum of the power as the statistical amount, and determine a state of the driving device in the automatic tool exchange device or the automatic pallet exchange device by comparing a threshold and the calculated statistical amount.

7. The data processing device of the production equipment according to claim 2, wherein the automatic tool exchange device is configured to replace a tool for machining a production target object or the automatic pallet exchange device is configured to replace a pallet on which the production target object is placed, and the processor is configured to calculate the operation processing time from the operation start time to the operation completion time of any operation of a clamp operation, an unclamp operation, and a rotation operation.

8. A data processing device of production equipment for predicting life of each of a plurality of types of tools when a plurality of types of workpieces are machined using the plurality of types of tools, the data processing device comprising:

a processor configured to:

acquire target data representing a state of the production equipment detected by a detector provided in the production equipment, the target data including a first data type which is classified into a plurality of groups and a second data type which is not classified into a plurality of groups;

acquire, in the production equipment, reference data including a reference for grouping the target data and a time in which the reference for grouping the target data operates in a case where the target data falls under the first data type;

generate, for each group of the reference data, combined data for each group obtained by combining, with the reference data, data detected in a same period of time as an operation period of time of the reference data in the target data in the case where the target data falls under the first data type;

acquire, when first machining of the plurality of types of workpieces is performed using a first tool for information acquisition corresponding to each of the plurality of types of tools, first machining information from a start of use of the first tool until exhaustion of life of the first tool;

store an arithmetic model determined based on the first machining information of the plurality of types of workpieces, the arithmetic model being for performing life prediction of a tool of a same type as the first tool;

acquire, when second machining of the plurality of types of workpieces is performed using a second tool, which is the tool of the same type as the first tool and is a life prediction target, second machining information at a time when the second machining is performed; and perform life prediction of the second tool based on the second machining information and the arithmetic model.

9. The data processing device of the production equipment according to claim 8, wherein the arithmetic model is configured to predict presence or absence of exhaustion of life and a remaining use time until the exhaustion of life, and the processor is configured to calculate presence or absence of exhaustion of life and a remaining use time until the exhaustion of life of the second tool based on the second machining information and the arithmetic model.

10. The data processing device of the production equipment according to claim 8, wherein the processor is configured to perform life prediction for the second tool at any time based on the second machining information and the arithmetic model at only the any time.

11. The data processing device of the production equipment according to claim 10, wherein the first machining information and the second machining information include a plurality of types of variables, and the arithmetic model performs the life prediction for the second tool at the any time using the plurality of types of variables.

* * * * *